United States Patent
Demiroz et al.

(10) Patent No.: US 12,026,637 B1
(45) Date of Patent: Jul. 2, 2024

(54) COMPUTER ASSISTED PROGRAMMING USING AUTOMATED NEXT NODE RECOMMENDER FOR COMPLEX DIRECTED ACYCLIC GRAPHS

(71) Applicant: Intuit Inc., Mountain View, CA (US)

(72) Inventors: Nazif Utku Demiroz, Mountain View, CA (US); Ashton Phillips Griffin, Steamboat Springs, CO (US); Robert Pienta, Mountain View, CA (US); Luis Enrique Castro, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/141,360

(22) Filed: Apr. 28, 2023

(51) Int. Cl.
- G06N 20/00 (2019.01)
- G06F 16/2457 (2019.01)
- G06N 7/01 (2023.01)

(52) U.S. Cl.
CPC ........ *G06N 7/01* (2023.01); *G06F 16/24578* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 2016/0205122 A1* | 7/2016 | Bassett | H04L 63/1416 726/23 |
| 2017/0213089 A1* | 7/2017 | Chen | G06V 20/10 |

* cited by examiner

Primary Examiner — David R Vincent
(74) Attorney, Agent, or Firm — Lathrop GPM LLP

(57) ABSTRACT

A method including setting an initial lookback path length for a current path in a directed acyclic graph. The current path includes a subset of the nodes connected by a sequence of the edges. The method also includes querying, for a current lookback path length, whether a matching key is present in a transition probability dictionary (TPD). The method also includes querying, responsive to the matching key being present in the TPD for the current lookback path length, whether a matching value is present for the matching key. The matching value includes a sample path in the TPD that matches the current path. Responsive to the matching value being present in the TPD for the matching key, a next node associated with the matching value is returned. The next node is connectable in a valid operational relationship to a last node in the current path.

12 Claims, 14 Drawing Sheets

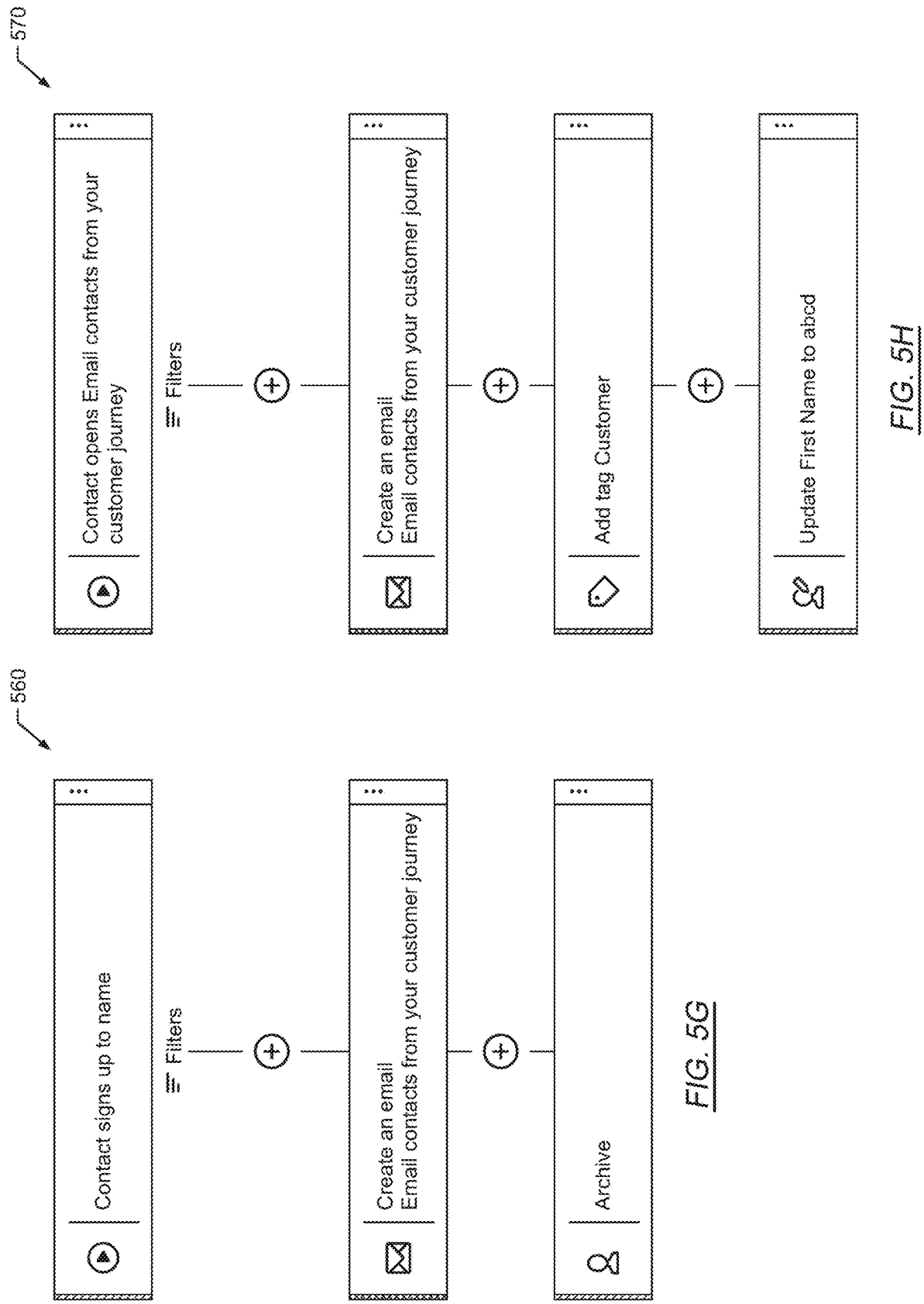

COMPUTER ASSISTED PROGRAMMING USING AUTOMATED NEXT NODE RECOMMENDER FOR COMPLEX DIRECTED ACYCLIC GRAPHS

BACKGROUND

Writing computer programs that implement computer algorithms is a skill that often requires intense technical training. Nevertheless, some individuals without such training still desire the ability to write the computer programs for their custom computer algorithms in a limited context.

For example, a business owner may wish to specify how a remote user accesses and uses an enterprise system that hosts the business owner's online marketplace. However, without technical programming skill, the business owner would have to decide between not customizing the programming of the online marketplace and hiring an expensive professional computer programmer to accomplish the desired programming.

SUMMARY

The one or more embodiments provide for a method. The method includes setting an initial lookback path length for a current path in a directed acyclic graph. The directed acyclic graph includes nodes, each of the nodes including a corresponding set of executable code which, when executed by a processor, performs an action on a computer. The directed acyclic graph also includes edges, each of the edges including an operational relationship between at least two of the nodes. The current path includes a subset of the nodes connected by a sequence of the edges. The method also includes querying, for a current lookback path length, whether a matching key is present in a transition probability dictionary (TPD). The current lookback path length initially includes the initial lookback path length. The method also includes querying, responsive to the matching key being present in the TPD for the current lookback path length, whether a matching value is present for the matching key. The matching value includes a sample path in the TPD that matches the current path. The method also includes returning, responsive to the matching value being present in the TPD for the matching key, a next node in the nodes of the directed acyclic graph. The next node is associated with the matching value as specified in the TPD. The next node is connectable in a valid operational relationship to a last node in the current path.

The one or more embodiments provide for another method. The method includes receiving a set of paths for a directed acyclic graph. The directed acyclic graph includes nodes, each of the nodes including a corresponding set of executable code which, when executed by a processor, performs an action on a computer. The directed acyclic graph also includes edges, each of the edges including an operational relationship between at least two of the nodes. The sets of paths include at least a subset of the nodes connected by a sequence of the edges. The method also includes determining a maximum training level and setting a current training level to the maximum training level. The method also includes constructing a transition probability set for the current training level. The transition probability set includes a set of probabilities that selected nodes in a subset of nodes of the nodes are a next node, relative to a current node in the nodes. The current node and the next node are in a sequence of executable nodes. The method also includes adding the transition probability set to a transition probability dictionary. The method also includes storing the transition probability dictionary as a final transition probability dictionary.

The one or more embodiments also provide for a system. The system includes a processor and a data repository in communication with the processor. The data repository stores a directed acyclic graph. The directed acyclic graph includes nodes, each of the nodes including a corresponding set of executable code which, when executed by a processor, performs an action on a computer. The directed acyclic graph also includes edges, each of the edges including an operational relationship between at least two of the nodes. The data repository also stores a current path in the directed acyclic graph. The current path includes a subset of the nodes connected by a sequence of the edges. The data repository also stores an initial lookback path length. The data repository also stores a current lookback path length. The current lookback path length initially includes the initial lookback path length. The data repository also stores a transition probability dictionary (TPD) including keys, a matching key, and values corresponding to the keys. The values include paths in the TPD. The values also include a matching value from among the values. The matching value includes a sample path in the TPD that matches the current path. The data repository also stores a next node in the nodes of the directed acyclic graph. The next node is associated with the matching value as specified in the TPD. The next node is connectable in a valid operational relationship to a last node in the current path. The system also includes a next node recommender which, when executed by the processor, is programmed to set the initial lookback path length for the current path in the directed acyclic graph. The next node recommender is also programmed to query, for the current lookback path length, whether a matching key is present in a transition probability dictionary (TPD). The next node recommender is also programmed to query, responsive to the key being present in the TPD for the current lookback path length, whether a matching value is present for the matching key. The next node recommender is also programmed to returning, responsive to the matching value being present in the TPD for the matching key, the next node.

Other aspects of the invention will be apparent from the following description and the appended claims.

BRIEF DESCRIPTION OF DRAWINGS

FIG. 5A, FIG. 5B, FIG. 5C, FIG. 5D, FIG. 5E, FIG. 5F, FIG. 5G, FIG. 5H, FIG. 5I, and FIG. 5J, show an example of computer assisted programming using an automated next node recommender for complex directed acyclic graphs, in accordance with one or more embodiments.

Like elements in the various figures are denoted by like reference numerals for consistency.

DETAILED DESCRIPTION

Figure 1:
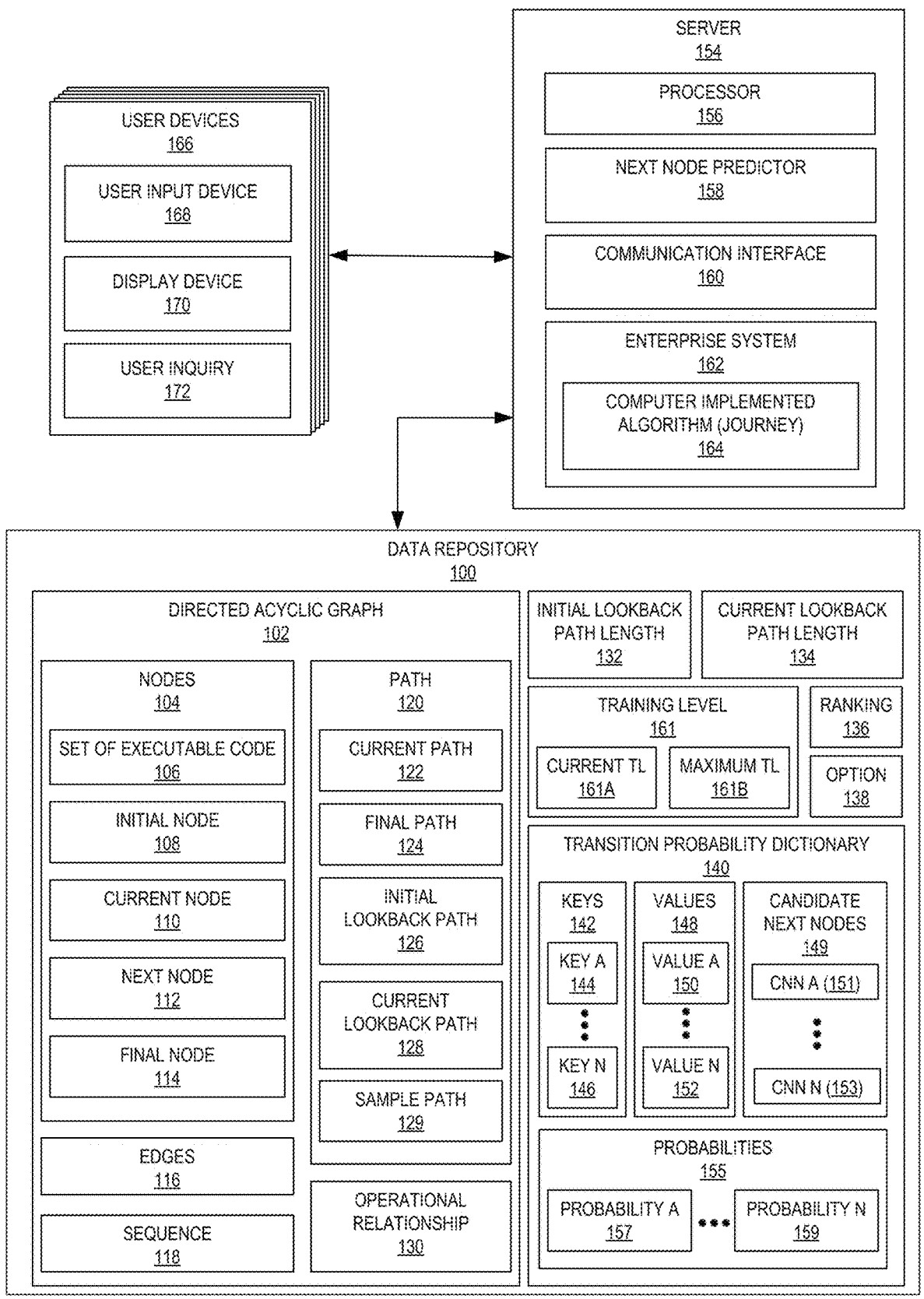
FIG. 1 shows a computing system, in accordance with one or more embodiments.

In general, the one or more embodiments are directed to computer assisted programming using an automated next node recommender for complex directed acyclic graphs. The one or more embodiments treat computer code blocks as nodes on a directed acyclic graph. Just as musical notes can be arranged in many different arrangements to form a melody, the computer code blocks (i.e., the nodes of the directed acyclic graph) may be connected to each other in many different arrangements to establish computer-encoded algorithms executable by a processor. In this manner, the nodes (i.e., the code blocks) may be arranged to create a wide variety of new computer programs. Thus, by arranging code blocks as a directed acyclic graph, users who have little or no training in computer programming can build complex algorithms specialized to the user's computing projects.

A technical problem exists when unskilled users use a directed acyclic graph to arrange code blocks to build a computer executable algorithm. The technical problem arises because the unskilled users may not know which blocks on the directed acyclic graph may be combined with a current block of the algorithm upon which the user is working. In other words, the users may become paralyzed with indecision, unable to continue building the algorithm because the users do not know what options exist to them for connecting a next code block to the current code block in the algorithm under construction. Such indecision may be undesirable, because frustrated users may not want to pay for and use the capabilities of the software that provides for computer-assisted construction of computer executable algorithms.

The technical problem that arises as a result of the user's indecision is how to program a computer to suggest, automatically, which nodes in the directed acyclic graph (i.e., which available code blocks) are suitable for association with the current code block in the user's computer algorithm under construction. Further, the technical problem may include how to program a computer to order, automatically, the available code blocks in an order such that higher priority code blocks are suggested to the user first. Higher priority code blocks are those code blocks that are more likely to achieve the user's purpose in constructing the computer executable algorithm, relative to other available code blocks. For example, while ten nodes may be suitable for association with a current node, it may be that only one or two of those available nodes are useful for achieving the user's purpose in constructing the computer executable algorithm.

In other words, the technical problem is how to program a computer to suggest, automatically, to a non-skilled user which code block (i.e. which node in the directed acyclic graph) should come next in the computer executable algorithm that the non-skilled user is attempting to build. The technical solution to the technical problem is expressed in the methods shown in FIG. 3 and FIG. 4B, and exemplified by the example shown in FIG. 5A through FIG. 5J.

In brief summary, the technical solution involves treating the current expression of the user's algorithm as a path in the directed acyclic graph, which also may be referred to as a journey on the directed acyclic graph. An initial lookback path length is set for the path. In other words, a number is selected, with the number representing how many code blocks (i.e., nodes on the directed acyclic graph) on the user's algorithm, just prior to the next unknown code block (i.e., after the current node block), will be examined.

A query is made whether a key is present in a transition probability dictionary for the current lookback path length. The transition probability dictionary represents the nodes in the directed acyclic graph that might follow the current node, with probabilities associated with each subsequent node being the most useful subsequent node to be associated with the current node. If one or more keys are found, then the nodes (i.e. code blocks) corresponding to the keys are returned to the user. The nodes may be ranked by probability.

The one or more embodiments model the node recommendation problem as a random walk on the directed acyclic graph. Each path (or journey) is modeled on the directed acyclic graph, where each step on the path represents the nodes in the graph. Transitions in the path are identified as a sequence to associate a node with a direction in the graph. After multiple sequences of paths have been generated, the one or more embodiments determine the path length to be considered for prediction of the next node. The stationary transition probabilities for each possible next node are determined. The next nodes are then presented, possibly in an order based on the ranking of a candidate next node.

Once the next node is determined, the next node may be presented. For example, the user may select from among the returned nodes as being the next node of the algorithm that the user is constructing. Alternatively, the next node may be automatically associated with the current node, thereby automatically advancing the construction of the computer executable algorithm.

Attention is now turned to the figures. FIG. 1 shows a computing system, in accordance with one or more embodiments. The system shown in FIG. 1 may be implanted in conjunction with the computing system and network environment shown in FIG. 6A and FIG. 6B.

In one or more embodiments, the data repository (100) is a storage unit and/or device (e.g., a file system, database, data structure, or any other storage mechanism) for storing data. The data repository (100) may include multiple different, potentially heterogeneous, storage units and/or devices.

Figure 2:
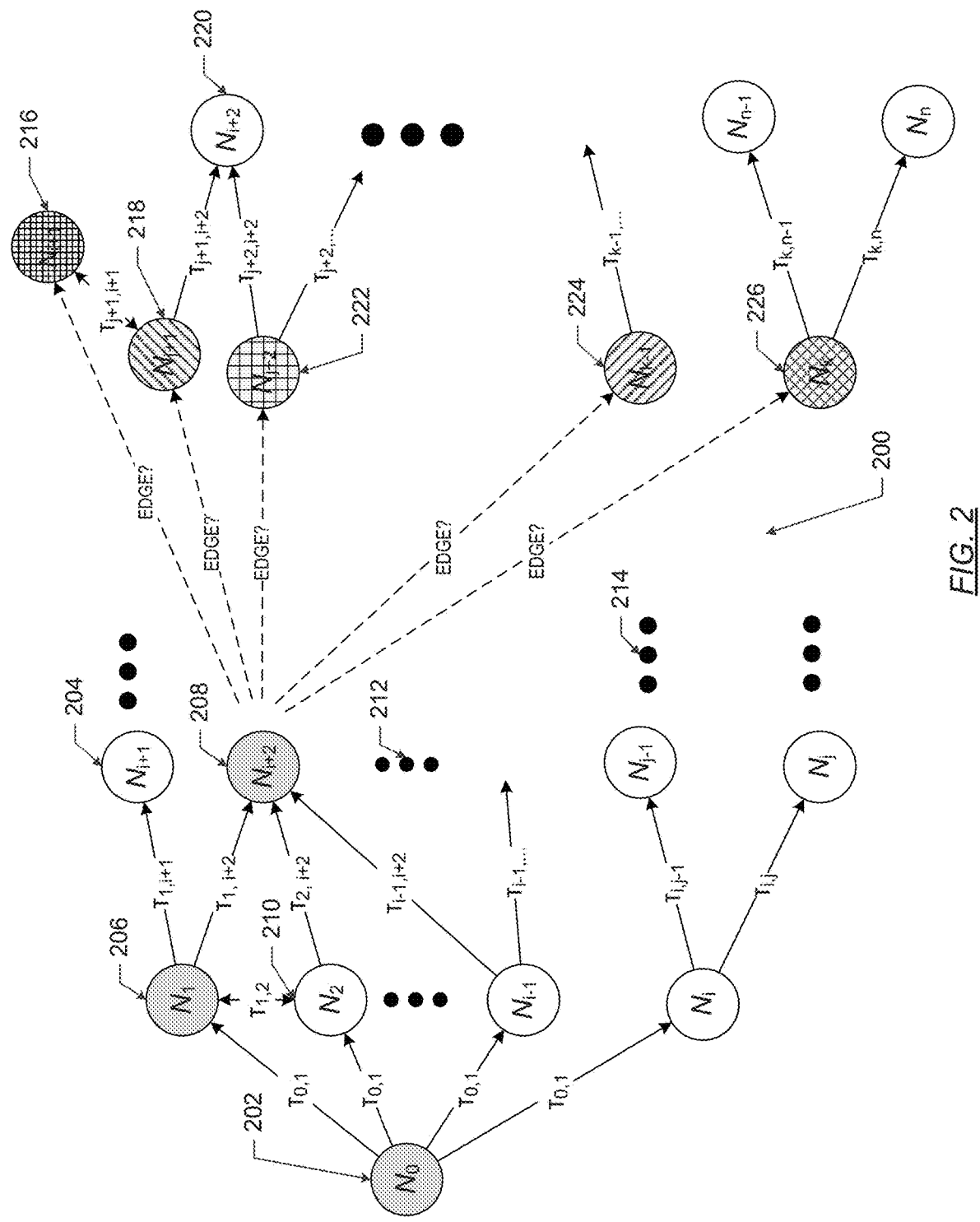
FIG. 2 shows an example of a directed acyclic graph, in accordance with one or more embodiments.

The data repository (100) includes a directed acyclic graph (102). The directed acyclic graph (102) is a graph with no directed cycles. The term "no directed cycles" means that the graph includes nodes (defined below) and edges (defined below), with each edge directed from one node to another such that following a connection from one node to another will never form a closed loop. Thus, a directed graph can be topologically ordered by arranging the nodes as a linear ordering that is consistent with some or all edge directions. An example of the directed acyclic graph (102) is shown in FIG. 2.

The directed acyclic graph (102) may be pre-defined, or may be generated when the transition probability dictionary (140) (defined below) is trained (i.e., generated). In the latter case, pre-processing may be performed prior to training the directed acyclic graph (102). During pre-processing, raw step data (i.e., the code blocks, and many different algorithms previously built with the code blocks) may be converted into the directed acyclic graph (102).

The directed acyclic graph (102) includes two or more nodes (104). Each of the nodes (104) is a unit of information in the directed acyclic graph (102). More specifically, in the one or more embodiments, each node contains at least a set of executable code (106). The set of executable code (106) is computer program code which, when executed by a computer processor, performs a computer implemented process. Examples of the set of executable code (106) include byte code, machine code, human-readable code (e.g., Python, JAVA®, C++, etc.), and interpreted languages such as programming terms used on specific programs (e.g., terms used to perform functions in MICROSOFT EXCEL®). The set of executable code (106) also may include source code in some embodiments.

The nodes (104) may contain additional information. For example, each of the nodes (104) may include a node identifier, metadata (e.g., describing versioning information, timestamps, etc. for a node), human-readable instructions or notes, or references or calls to other sets of executable code. Thus, each of the nodes (104) may represent more than simply the set of executable code (106).

The nodes (104) may be combined, as described further below. When combined, the combination of nodes is referred to as a computer implemented "algorithm" As used herein, each instance of the set of executable code (106) is referred-to as a computer implemented, or computer-implementable, program.

The terms "algorithm," "function," "computer implemented method," and "procedure" have the same technical meaning (i.e., computer-readable program code that is executable by a processor), but the terms are used separately for clarity. Specifically, the terms are used to clearly indicate whether reference is being made to the set of executable code (106) of the nodes (104) (i.e. a computer implemented "process") or reference is being made to the collection of the nodes (104) that forms the larger computer implemented algorithm (164) (i.e., the "computer implemented method"), defined further below.

Several terms are used in the one or more embodiments to refer to the nodes (104). The terms are used for clarity in the relationships among the nodes (104), but structurally each of the following node types is a "node," as defined above with respect to the nodes (104). Each of the terms may be used with respect to the computer implemented algorithm (164) defined further below.

Thus, the nodes (104) include an initial node (108), a current node (110), a next node (112), a candidate next node (e.g. candidate next nodes (149), CNN A (151), and CNN N (153)), and a final node (114). The initial node (108) refers to the starting node in a computer implemented algorithm. The current node (110) is the node in the computer implemented algorithm that is currently under consideration.

The next node (112) is the node that will be added to the computer implemented algorithm immediately after the current node (110). In other words, the next node (112) is added to the current path.

The candidate next node is defined below with respect to the definition of "candidate next nodes" (149). Briefly, a candidate next node is a possible node within the transition probability dictionary (140) which may be the final node (114).

The next node (112) is selected from among the candidate next nodes. The next node (112) may be automatically selected, as described further below with respect to FIG. 3 through FIG. 5J. In the case that a user selects one of the candidate next nodes as the next node (112), as described with respect to FIG. 3 through FIG. 5J, the next node (112) may be referred to as a "selected next node."

The final node (114) is the final node in the computer implemented algorithm that the user is constructing. Once the initial node (108), the final node (114), and intervening nodes are set, and their relationships are defined, the computer implemented algorithm is completed.

The final node (114) may be the next node (112) in some embodiments. However, because the user may continue to ask the system of FIG. 1 to recommend additional next nodes, or may choose to add more nodes without asking the system of FIG. 1 to recommend a next node, it is possible that the final node (114) is not the next node (112).

The directed acyclic graph (102) also includes one or more edges (116). The edges (116) represent directional relationships between the nodes (104). Thus, for example, one of the edges (116) may connect the initial node (108) to the current node (110), indicating that computer implemented process of the initial node (108) is to be performed before the computer implemented process is to be performed. In an example, the code of the initial node (108) may call the code of the current node (110). In the one or more embodiments the edges (116) are defined such that the combination of the nodes (104) and the edges (116) meet the definition of the directed acyclic graph (102).

The one or more embodiments also refer to a sequence (118) of nodes. The sequence (118) of nodes represents the arrangement of the nodes (104) and the edges (116) that forms the current version of the computer implemented algorithm Thus for example, the current node (110) and the next node (112) form part of the sequence (118) of nodes in the computer implemented algorithm under construction. The sequence (118) is not complete (i.e., is not a completed sequence) until all desired nodes have been defined for the computer implemented algorithm.

The one or more embodiments refer to a path (120). The path (120) is a set of the nodes (104) that is within the sequence (118) of the nodes (104) that form the computer implemented algorithm Thus, the path (120) may be considered a sub-sequence of the sequence (118), or may be considered a sub-path of the nodes (104) within the computer implemented algorithm.

Several terms are used in the one or more embodiments to refer to the path (120). The terms are used for clarity to indicate different sets of nodes in the sequence (118) that each form an individually defined path (120). Thus, the path (120) includes reference to a current path (122), a final path (124), an initial lookback path (126), a current lookback path (128), and a sample path (129).

The current path (122) is the path (120) of the nodes (104) that forms the current version of the sequence (118) that defines the current version of the computer implemented algorithm under construction. In other words, the computer implemented algorithm is incomplete, but the current arrangement of nodes may be characterized as the current path (122) in the directed acyclic graph (102).

The final path (124) is the final arrangement of the nodes (104) in the sequence (118) that forms the final version of the computer implemented algorithm Thus, the final path (124) represents an arrangement of the nodes (104) and the edges (116) that, together, form the desired computer implemented algorithm.

Reference is made to the initial lookback path (126) and the current lookback path (128). Both the initial lookback path (126) and the current lookback path (128) are types of a "lookback path." A lookback path is a path (120) of the nodes (104) within the current version of the sequence (118) of the nodes (104), starting with the current node (110) (i.e., the node under consideration) and working backwards along the edges (116) towards the initial node (108) along the path (120). Thus, for example, the current node (110) and the immediately prior node connected to the current node (110) by one of the edges (116) together form an example of a lookback path. If the initial node (108) is connected directly to the current node (110) by one of the edges (116), then together the current node (110) and the initial node (108) form a lookback path.

The initial lookback path (126) is a lookback path that is initially defined during the process of searching for a possible next node (112) in the sequence (118) from among the set of all possible nodes in the nodes (104). The process and the use of the initial lookback path (126) are described with respect to FIG. 3. An example of the use of the initial lookback path (126) is shown in FIG. 5F.

Figure 3:
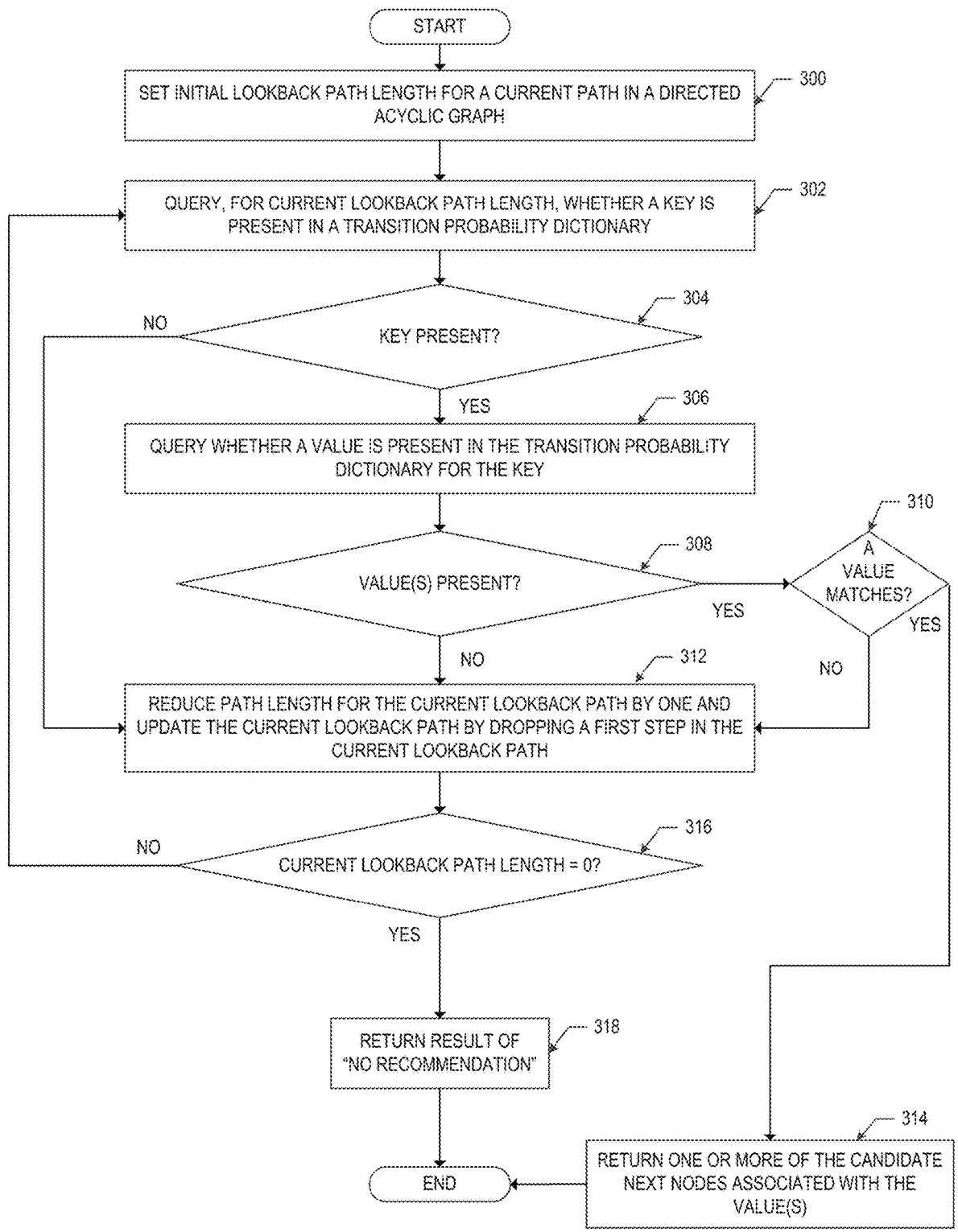
FIG. 3, FIG. 4A, and FIG. 4B show flowcharts of methods, in accordance with one or more embodiments.
Figure 4A:
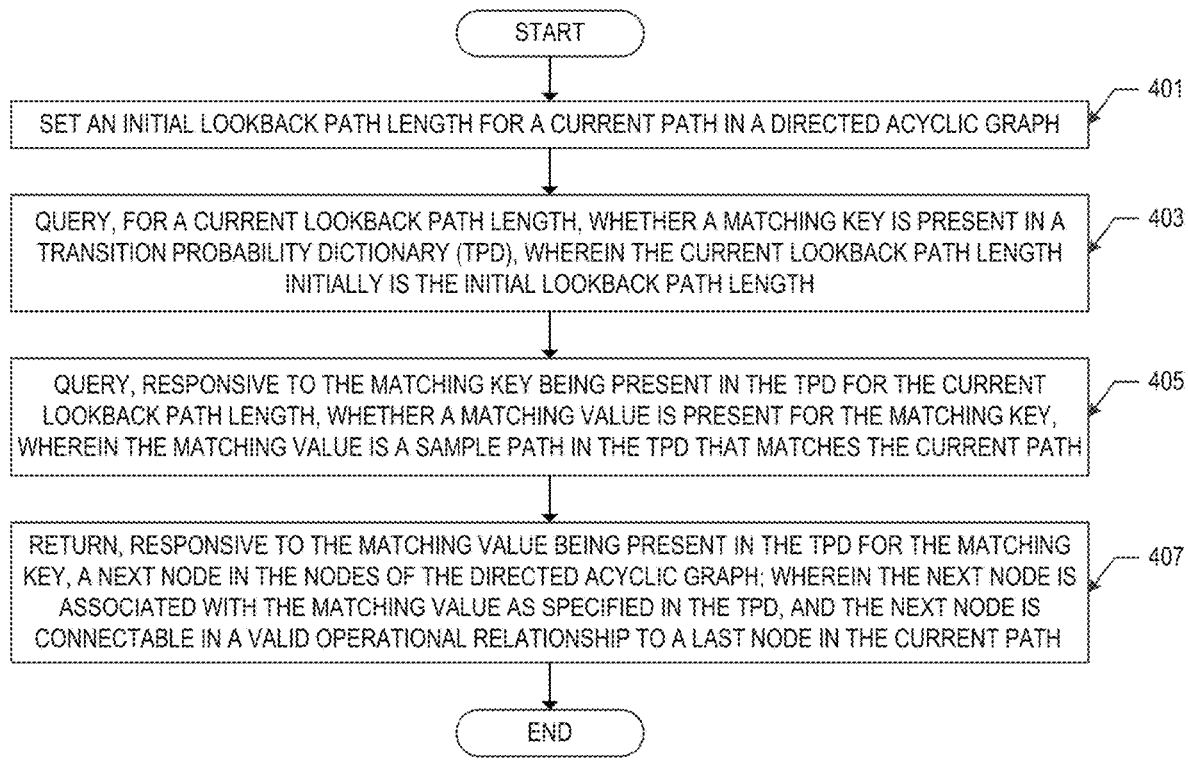
Figure 5A:
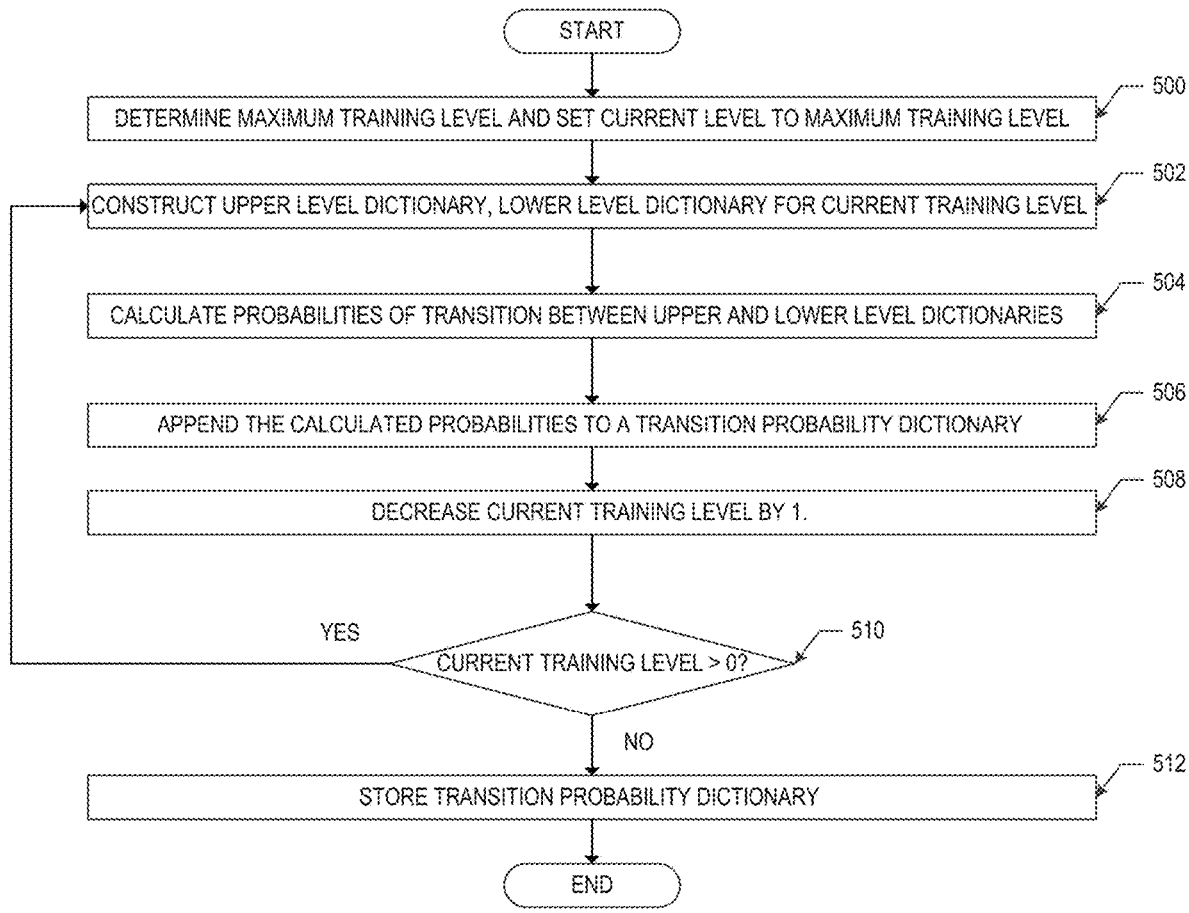
Figure 5B:
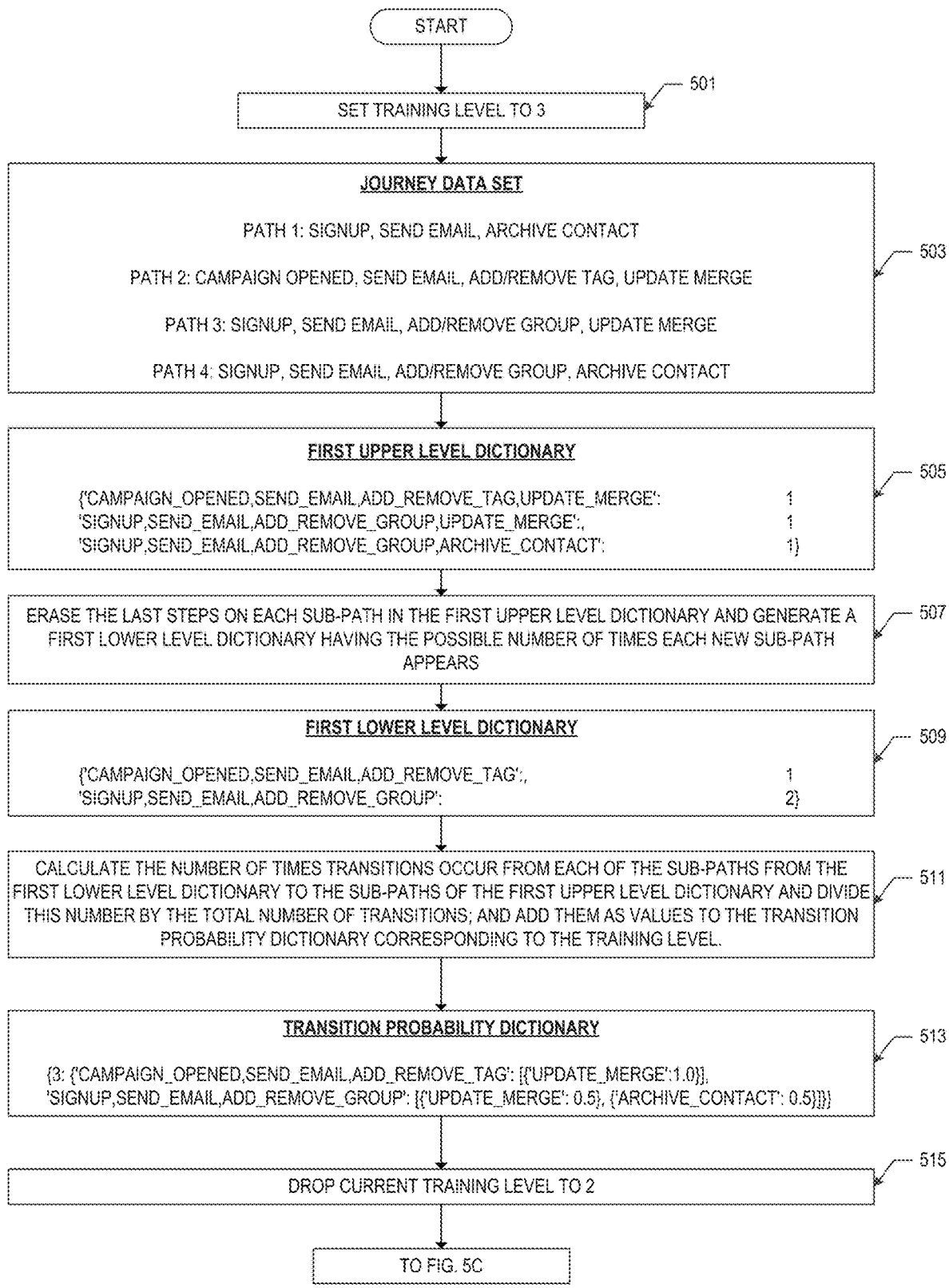
Figure 5C:
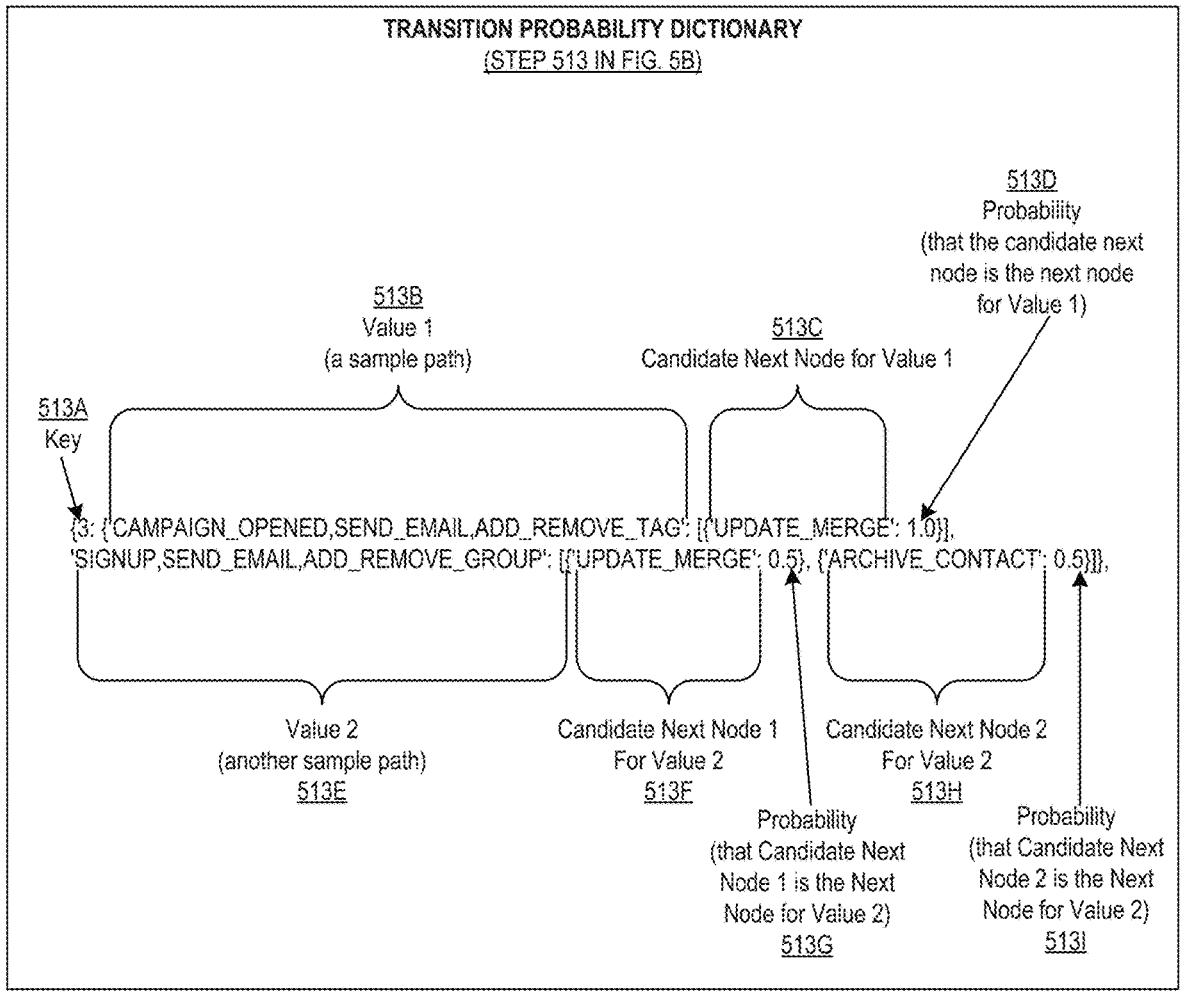
Figure 5D:
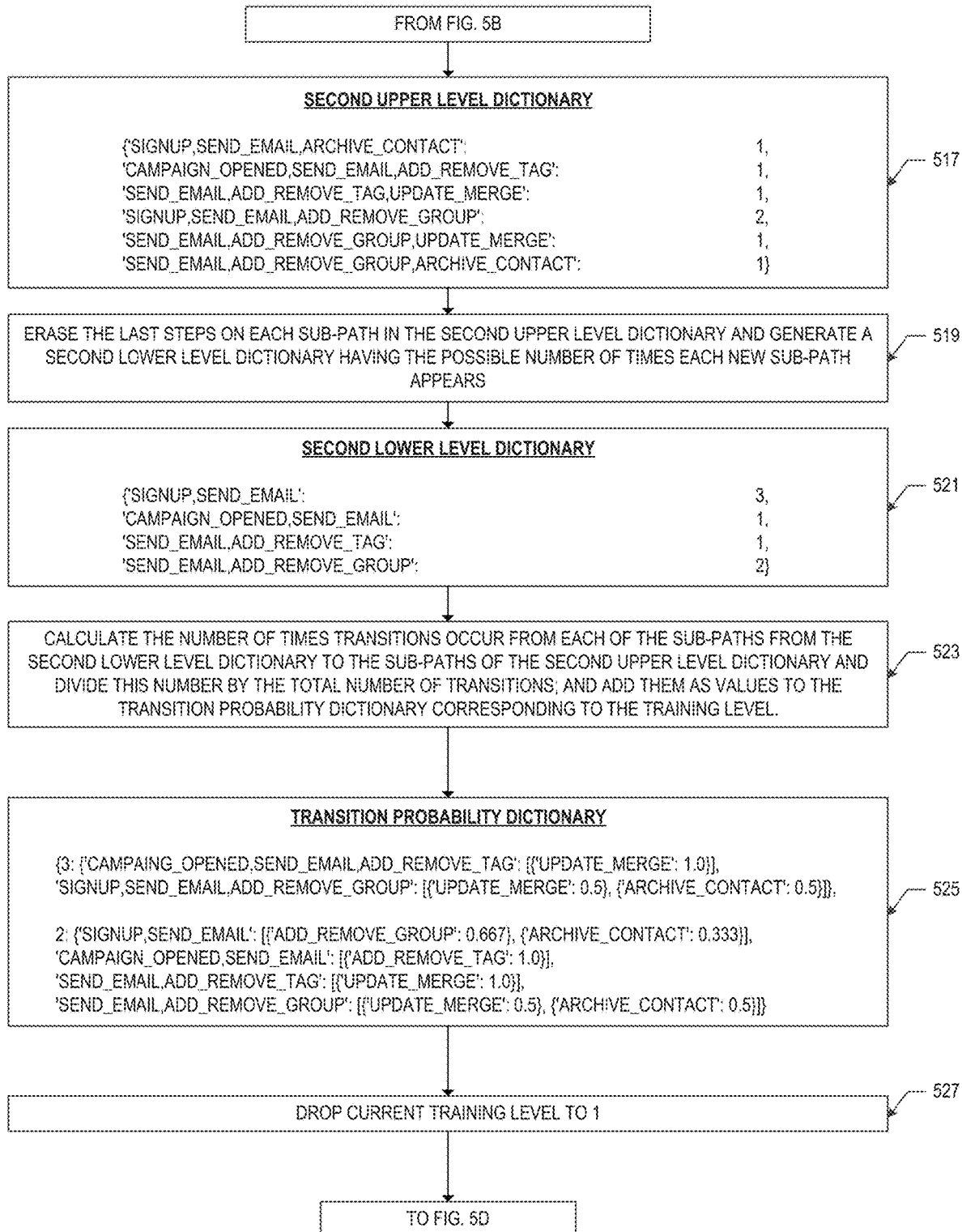
Figure 5E:
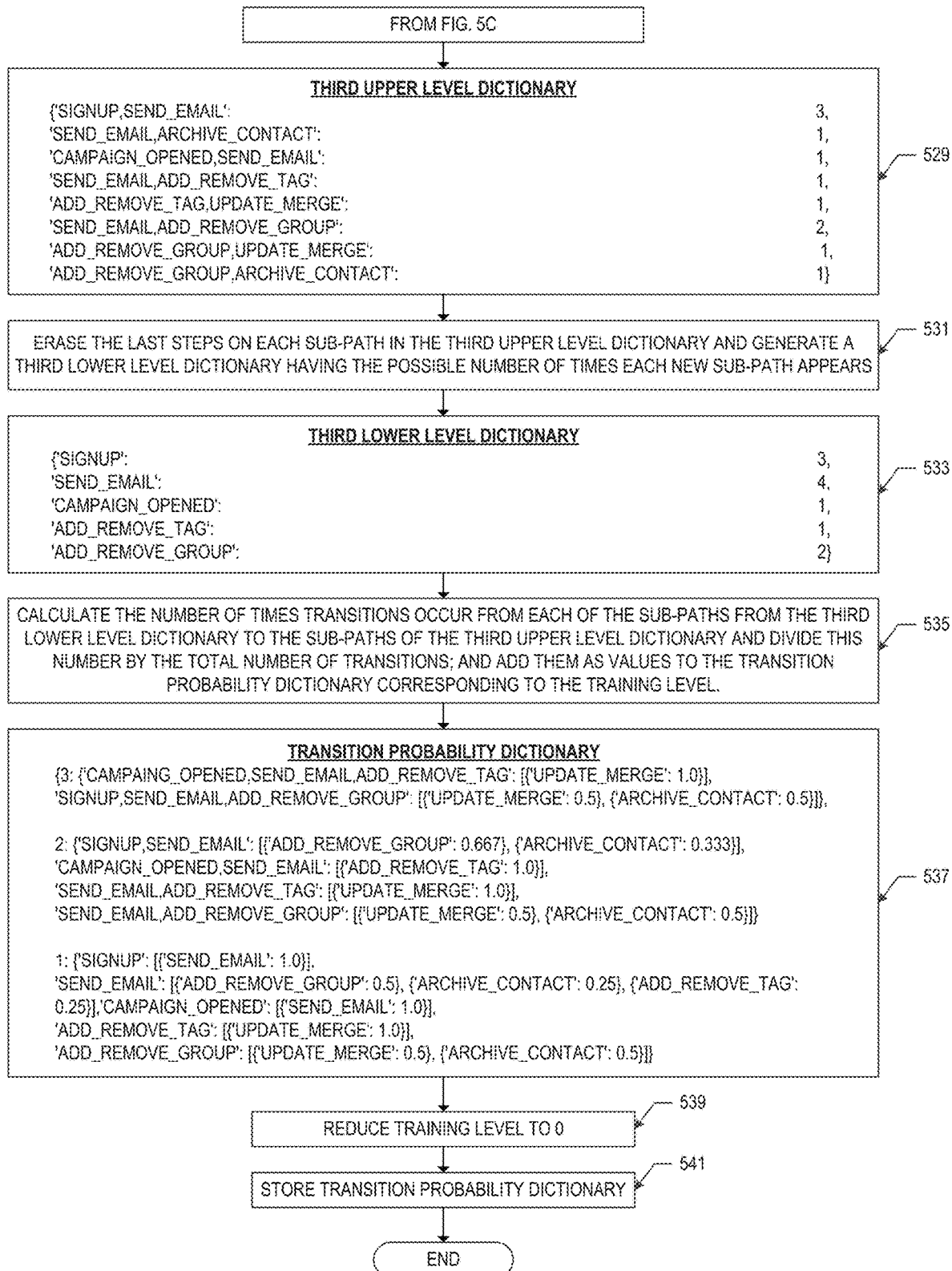
Figure 5F:
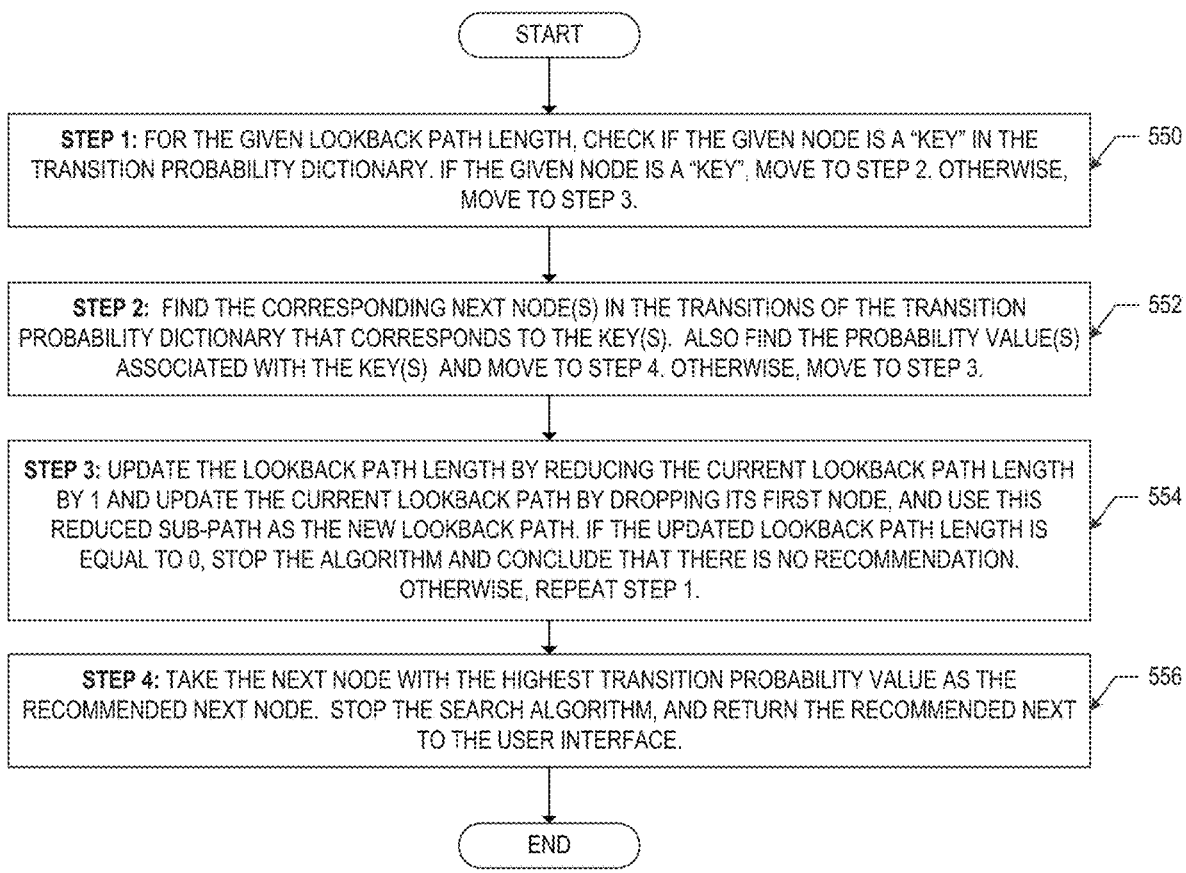

The current lookback path (128) is a lookback path that is current lookback path being used during the process of determining candidates for the next node (112), as described with respect to FIG. 3 and FIG. 4A, and as exemplified in FIG. 5F. Initially, the current lookback path (128) is the initial lookback path (126). Thereafter, during the process described in FIG. 3, the current lookback path (128) may be different than the initial lookback path (126).

A sample path (129) is a valid path within the directed acyclic graph (102) that has a length equal to a key (e.g. Key A (144)) in the keys (142) (defined below). Each value (e.g., Value A (150) among the values (148), defined bellow) in the transition probability dictionary (140) is a sample path (129). An example of a sample path (129) is shown in FIG. 5C.

Because it is possible for multiple values to exist for each key, there may be multiple sample paths for each key. Together, all values (148) (defined below) for a key within the keys (142) may represent some or all possible sample paths for the path length defined by the key.

The sample path (129) is a term that is used with respect to use of the transition probability dictionary (140), also defined below, as described with respect to FIG. 3 through FIG. 5F. While all values (148) are sample paths, not all sample paths are values (148). Thus, it is possible that sample path (129) is not a value in the transition probability dictionary (140).

Attention is now turned to lookback path lengths. The initial lookback path (126) has an initial lookback path length (132). The initial lookback path length (132) is a number that represents the number of nodes present in the initial lookback path (126).

The current lookback path (128) has a current lookback path length (134). The current lookback path length (134) is a number that represents the number of nodes present in the current lookback path (128). Initially, during the process of FIG. 3, the current lookback path length (134) is equal to the initial lookback path length (132). However, after the initial iteration of the process of the method of FIG. 3, the current lookback path length (134) is less than the initial lookback path length (132).

Attention is now turned to other aspects of the directed acyclic graph (102). In the directed acyclic graph (102), an operational relationship (130) exists between at least two of the nodes (104) that are connected, directly or indirectly, by the edges (116). Specifically, the edges (116) define the operational relationship (130) between connected ones of the nodes (104). The operational relationship (130) indicates how one node interacts with the other.

For example, assume the initial node (108) is in an operational relationship (130) with the current node (110). The edge that connects the initial node (108) with the current node (110) contains data or instructions that indicate how the computer readable code of the initial node (108) interacts with the current node (110). In a specific example, the operational relationship (130) defined by the edge may indicate that the current node (110) is to be executed after executing the initial node (108). In another example, the operational relationship (130) defined by the edge may cause the initial node (108) to call the current node (110) to return an intermediate result, and thereafter specify that a subsequent node in the path (120) execute. In this example, the subsequent node uses the output from the execution of the code of the initial node (108) and the output from the execution of the code of the current node (110).

Thus, the operational relationship (130) between two or more of the nodes (104) is the "glue" (to use an analogy) that operationally connects the nodes (104) to form the path (120). In this manner, the overall implementation of the computer implemented algorithm generated according to the one or more embodiments may be more than the simple accumulation of a sequence of code blocks represented by the nodes (104). For example, the operational relationship (130) may define the sequences of execution of the set of executable code (106) in each of the nodes (104), thereby changing the output of the final computer implemented algorithm (164) defined below.

The data repository (100) also may store other information. For example, the data repository (100) may store a ranking (136). The ranking (136) is a series of candidate next nodes (i.e., two or more instances of the candidate next node (113) that are commonly associated with a value (e.g., Value A (150) defined below), wherein the series of candidate next nodes are organized in descending order of probability that a given candidate next node is the next node (112). In other words, the ranking (136) is a list of candidate next nodes associated with a particular value, wherein the list is presented in descending order of probability that a given candidate next node in the list is the next node (112).

An example of a ranking (136) is shown in FIG. 5C (see probability (513G) and probability (513I). Another example of a ranking (136) is shown in FIG. 5E (see the transition probability dictionary at step 537, key "1", second value ("'send email'"), where three candidate next nodes are shown in descending order of probability).

The probability is defined further below with respect to probabilities (155). Briefly, the probability is a number associated with a candidate next node. The number represents the likelihood that the associated candidate next node will be the next node (112) in the directed acyclic graph (102) after the sample path (129) has been followed. The probability is determined according to the method of FIG. 4B and as exemplified by the example of FIG. 5A through FIG. 5E.

The data repository (100) also may store an option (138). The option (138) is used during the execution of the computer implemented algorithm at run time, after the final path (124) has already been established. The option (138) is a prompt for a remote user to provide input. A remote user is a user that using a computer system that is not considered part of the system of FIG. 1. For example, a remote user maybe a customer user that uses an algorithm created by a merchant user according to the one or more embodiments.

For example, the computer implemented algorithm may be a program that, when executed, guides a customer through use of an online marketplace hosted by an enterprise system. The initial node (108) may output an option, which is presented to the customer's (e.g., "do you wish to participate in 'Option A' or 'Option B'"). Depending on the customer's response to the option, a subsequent node in the path (120) of the computer implemented algorithm may be executed.

The data repository (100) also may store a transition probability dictionary (140). The transition probability dictionary (140) also may be referred-to as a "TPD." The transition probability dictionary (140) is a dictionary that defines the possible transitions between nodes in the path (120) for a pre-determined set of paths, together with probabilities that each next node in the TPD follows from a current node in the TPD. For example, if 99 paths are being considered, then the transition probability dictionary defines the possible transitions between the nodes used in the 99 paths. In addition, each transition between two connected nodes is associated with a probability that the corresponding transition will occur in the 99 paths.

The transition probability dictionary (140) may be defined by keys (142) (e.g., key A (144) through key N (146)), values (148) (e.g., value A (150) through value N (152)), candidate next nodes (149) (e.g., CNN A (151) through CNN N (153)), and probabilities (155) (e.g. probability A (157) through probability N (159)). Each of the key (142) has zero or more values. Each of the values (148) is a sample path (e.g., sample path (129)) that has one or more candidate next nodes (149). Each candidate next node of the candidate next nodes (149) has one corresponding probability from the probabilities (155).

Each of the keys (142), the values (148), the candidate next nodes (149), and the probabilities (155) are defined below. Examples of the keys (142), the values (148), the candidate next nodes (149), and the probabilities (155) are shown in FIG. 5C.

The keys (142) are numbers representing a path length in the directed acyclic graph (102), meaning that the number of a key generally is not greater than a total length of a maximum-length path in the directed acyclic graph (102). It is possible that one or more of the keys (142) have a path length greater than the total length of a maximum-length path in the directed acyclic graph (102); however, keys above the maximum-length path would have empty values (148).

The transition probability dictionary (140) may have, and is likely to have, multiple keys. The keys (142) serve as a reference during the use of the transition probability dictionary (140).

The use of the keys (142) is described with respect to FIG. 3, FIG. 4A, and FIG. 5F. The generation of the keys (142) is described with respect to FIG. 4B and exemplified by FIG. 5A through FIG. 5E.

Each of the keys (142) is associated with one or more of the values (148). The values (148) are sample paths associated with the corresponding keys (142). Thus, for example, the key A (144) may be associated with one or more of the value A (150) through the value N (152). Concurrently, the key N (146) may be associated with one or more of the value A (150) through the value N (152).

Again, the values (148) may be, for example, the sample path (129), and thus the values (148) are not numbers. Instead the term "value," as used with respect to the transition probability dictionary (140), represents a sample path (e.g., the sample path (129)) in the transition probability dictionary (140).

Each of the values (148) is associated with one or more candidate next nodes (149). The candidate next nodes (149) are nodes within the directed acyclic graph (102) that could possibly follow in a valid operational relationship after the current node (110) in the sample path (129). Thus, the candidate next nodes (149) are candidates for selection as the next node (112). For example, the value A (150) may be associated with one or more of the candidate next node CNN A (151) through the candidate next node CNN B (153). Concurrently, the value N (152) may be associated with one or more of the candidate next node CNN A (151) through the candidate next node CNN B (153).

The probabilities (155) are numbers associated with the candidate next nodes (149). The numbers represents the probabilities that the associated candidate next nodes (149) will be the next node (112) in the directed acyclic graph (102) after the sample paths represented by the values (148) have been followed.

Each corresponding probability of the probabilities (155) is associated with exactly one corresponding candidate next node in the candidate next nodes (149). Thus, for example, the candidate next node CNN A (151) is associated with the probability A (157), but not the probability N (159) or any other probability in between.

The probabilities (155) also may be referred to as transition probabilities. A transition is a connection between one node and an immediately adjacent node. Thus, a transition probability is the probability that the immediately adjacent node will follow after the one node in question.

The transition probability is defined by the number of times that transitions occur between paths in a lower level dictionary to paths in an upper level dictionary, divided by total number of transitions between the lower and upper level dictionaries. This process is described with respect to FIG. 4B and FIG. 5A, and exemplified by FIG. 5B through FIG. 5E. Thus, the probabilities (155) may be generated as described with respect to FIG. 4B and FIG. 5A, and exemplified by FIG. 5B through FIG. 5E.

Figure 4B:
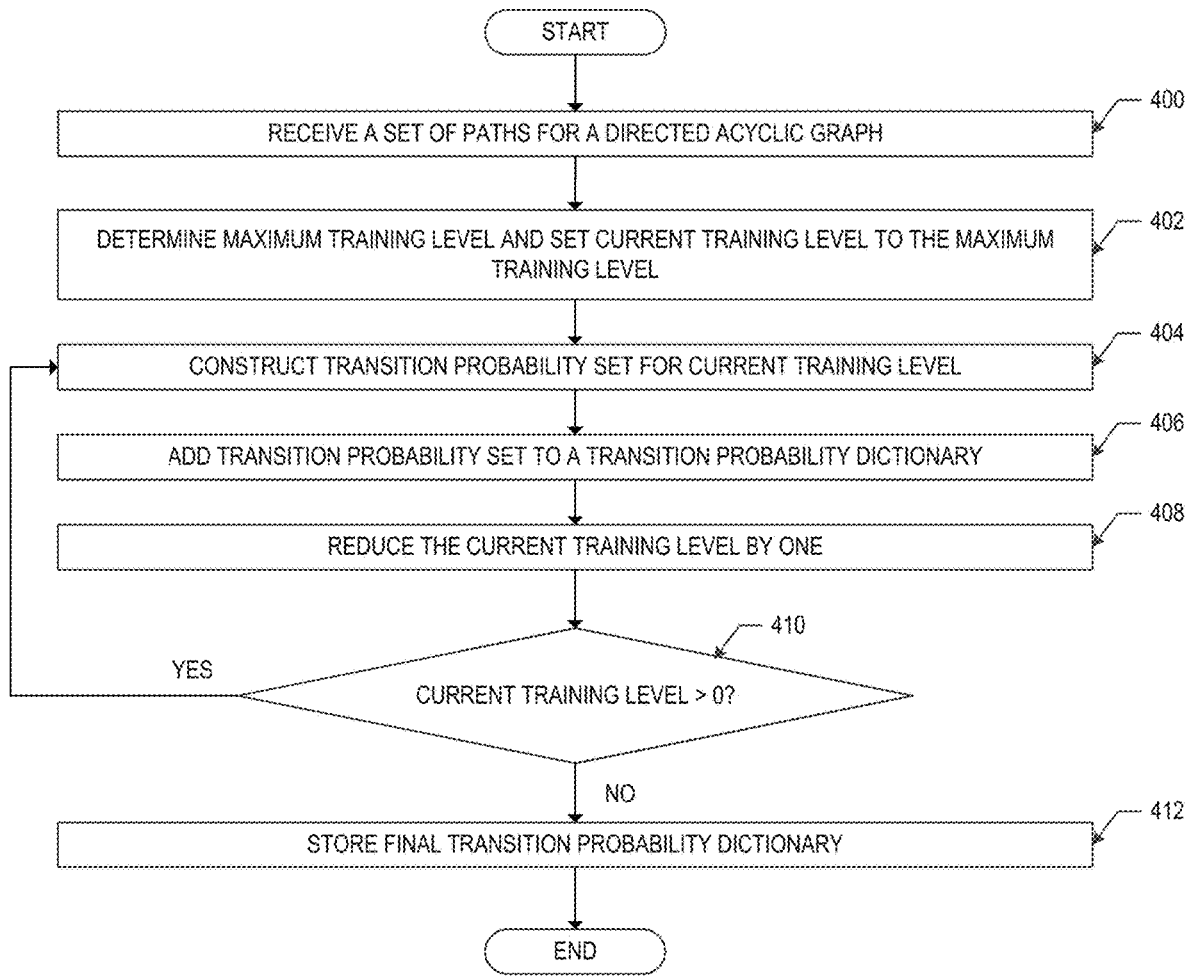

The process of generating the transition probability dictionary (140) is also described with respect to FIG. 4B and FIG. 5A, and exemplified by FIG. 5B through FIG. 5E. The process of generating the transition probability dictionary (140) may be referred to as a "training phase."

Briefly, the training phase involves, for a each of possibly multiple training levels, upper and lower level dictionaries, and then determining the probabilities of transitions between the upper and lower level dictionaries. See, for example, FIG. 5A.

A training level (161) is the length of a sub-path, within the current path (122) within the directed acyclic graph (102). Thus, the training level (161) is a type of path length. The sub-path is examined for transitions, as described with respect to FIG. 4B and FIG. 5A.

The current training level (i.e. current TL (161A)) is the training level in for which transitions are being examined during the process of building a transition probability dictionary (140). In the method of FIG. 4B and FIG. 5A the training level decreases by one each pass of the method until the current TL (161A) equals zero.

The maximum training level (i.e. maximum TL (161B)) is the highest training level that is initially set when initiating the training process (i.e., at the initiation of the method of FIG. 4B or the method of FIG. 5A). For example, if the maximum TL (161B) is "5", then the maximum length of a sub path of nodes in the current path (122) will be 5 when the process of building the transition probability dictionary (140) is initiated in the method of FIG. 4B or FIG. 5A.

The upper level dictionary is the set of sub-paths that have a path length that is at least greater than or equal to the current TL (161A), plus one. In turn, the lower level dictionary is the set of sub-paths that form the upper level dictionary, but with the last step on each of the sub-paths deleted.

In the lower level dictionary, any duplicate paths that appear are consolidated and counted together. Consolidating and counting together does not mean deleting duplicate entries. Rather, consolidating and counted together means that only a single entry for duplicate paths is returned, and the number of times that a path appears for the single entry is also returned. See the example of FIG. 5B through FIG. 5E for a particular example of this process.

Note that the upper level dictionary and the lower level dictionary will be different at each iteration of the transition probability dictionary training process. However, the transitions between each set of upper and lower level dictionaries will be stored with associated keys in the transition probability dictionary (140). Again, see the example of FIG. 5B through FIG. 5E for an example.

The system shown in FIG. 1 may include other components. For example, the system may include a server (154). The server (154) is one or more computers, in a possibly distributed computing environment, that together host the computer program code executable to perform one or more embodiments described with respect to FIG. 3 through FIG. 5, and to store the information described in the data repository (100).

The server (154) includes a processor (156). The processor (156) is a hardware processor or a virtual processor configured to execute the one or more embodiments described herein. An example of the processor (156) is the computer processor described with respect to FIG. 6A.

The server (154) includes a next node recommender (158). The next node recommender (158) is software or application specific hardware programmed to perform the method described with respect to FIG. 3, when executed by the processor (156). The next node recommender (158) is programmed to build the transition probability dictionary (140), according to the method shown in FIG. 4B and exemplified by FIG. 5A.

The server (154) also may include a communication interface (160). The communication interface (160) is hardware and/or software which permits the server (154), and the next node recommender (158), to communicate with one or more user input devices (168), defined below.

The server (154) also may execute or host an enterprise system (162). The enterprise system (162) is the computer hardware, computer storage, and related programming software that an organization uses as the establishment for the organization's information technology infrastructure. An enterprise system may be, for example, the computer hardware, storage, and software that is used to implement an online marketplace for a business.

One of the software applications available on the enterprise system (162) may be a computer implemented algorithm (164). Again, the computer implemented algorithm (164) is the completed path that a user develops, including the initial node (108), the final node (114), and intervening nodes, plus the edges (116) that connects the nodes. The computer implemented algorithm (164) may be referred to as a "journey."

As an example, the computer implemented algorithm (164) is hosted by the enterprise system (162), which in this example is an online marketplace. A customer user purchases a widget. In response, the computer implemented algorithm (164) executes, helping the customer purchase the widget. The computer implemented algorithm for purchasing the widget proceeds according to the sequence (118) of nodes defined for the path (120) according to the method of FIG. 3.

In another example, the computer implemented algorithm (164) is a sign-up process for new users. Thus, when a new user establishes an account with the enterprise system (162), the computer implemented algorithm (164) guides the new user through submitting desired information and signing forms needed for establishing an new account. The computer implemented algorithm for establishing the account with the enterprise system (162) proceeds according to the sequence (118) of nodes defined for the path (120) according to the method of FIG. 3.

The system shown in FIG. 1 may include other components, or may be connected to remote devices. Thus, the one or more user devices (166) shown in FIG. 1 may be part of the system of FIG. 1, but may be external to the system of FIG. 1, or a combination thereof. The user devices (166) are computers which users use to communicate the server (154), and thus to communicate with the next node recommender (158) and the enterprise system (162) via the communication interface (160).

The user devices (166) each include a user input device (168). The user input device (168) may be devices a user uses to provide input to a computer, such as mice, keyboards, touchscreens, microphones, etc.

The user devices (166) also each include at least one display device (170). The display device (170) conveys human-interpretable information to a user. The display device (170) may be a monitor, a speaker, a projector, a television, etc.

The user devices (166) may be used to transmit a user inquiry (172). The user inquiry (172) is a command or a query which, when received by the enterprise system (162), causes the initial node (108) in the computer implemented algorithm (164) to be executed. Thus, the user inquiry (172) initiates execution of the computer implemented algorithm (164).

FIG. 2 shows an example of a directed acyclic graph, in accordance with one or more embodiments. The directed acyclic graph (200) shown in FIG. 2 may be an example of the directed acyclic graph (102) shown in FIG. 1.

Each node in the directed acyclic graph (200) shown in FIG. 2 is one of the nodes (104) defined with respect to FIG. 1, and thus represents at least a block of computer executable code. The nodes are represented by a capital "N" surrounded by a circle. The identifier of a node is represented by a subscript. Thus, for example, node (202) is represented by No. The number "0" in the subscript indicates that the node (202) is a root node in the directed acyclic graph (200). A root node is a node that is not dependent on any other node in the directed acyclic graph (200).

Letters in the subscript identifiers of nodes indicate the dependence of a node on a prior node. Thus, for example node (204) is labeled as $N_{i+1}$. Node "I" indicates that the 204 depends from node $N_1$ (206), and "+1" indicates that the 204 is the first such node to depend from the node $N_1$ (206). However, nodes may have multiple dependent relationships. Thus, for example node (208) depends from both node $N_1$ (206) and from node N2 (210). However, because node (208) is in the current path of an algorithm under construction, the label for the node (208) may be node $N_{i+2}$ (208).

The nodes are connected by edges, represented by the arrows shown in FIG. 2. Each edge is identified by the letter "T" plus a subscript. The subscript indicates the connection between node identifiers. As shown, a node may depend on multiple nodes, and a node may have multiple nodes upon which depend on it.

If a node is not connected by an edge, then it is assumed that it is not appropriate to connect those nodes. In the context of the one or more embodiments, the code blocks represented by unconnected nodes may be unsuitable for connection to each other. In a specific example, code for registering a user with an enterprise system (a first node) may not be suitable for connection to code for adding a selected widget to a cart of an online marketplace (a second node). Thus, the first node and the second node are not suitable for connection, and no edge exists between the first node and the second node.

Nodes in the current path are represented by shading. Thus, node (202), node (206), and node (208) are shown in FIG. 2 as having a first shading pattern. Many other nodes are present in the directed acyclic graph (200), but the current path of nodes are the three nodes indicated. Thus, for example, vertical ellipses (e.g. vertical ellipses (212)) and horizontal ellipses (e.g. horizontal ellipses (214)) shown in FIG. 2 indicate the presence of possibly many intervening nodes.

The technical problem solved by the one or more embodiments arises when the user is constructing the algorithm and is currently at the node (208) in the path that the user has already constructed at a given time. The user lacking in programming skill does not necessarily know which nodes, among the nodes in the directed acyclic graph (200), may be suitable selections to be in the path after the node (208). As shown in FIG. 2, many additional nodes are suitable for connection to the node (208), but the user may select a next node which is suboptimal, or perhaps the user simply has no idea which step should come next in the algorithm that the user is constructing.

The set of candidate nodes suitable for connection to the node (208) are shown in FIG. 2 as being filled with different hashing patterns. Thus, each of node (216), node (218), node (220), node (222), node (224), and node (226) are the suitable candidate nodes for connection to the node (208). The edges represented by dashed lines (and labeled with "EDGE?") indicate candidate edges that connect to the candidate nodes, as shown. The one or more embodiments are useful for automatically selecting, or proposing for selection by the user, one of the available candidate nodes as being the most suitable next node in the path.

The technical solution for the technical problem described above involves using a transition probability dictionary to identify which of the node (216), node (218), node (220), node (222), node (224), and node (226) is the node that is most likely to be a useful next node in the path after the node (202), the node (206), and the node (208) have been executed. The process of using the transition probability dictionary is described with respect to FIG. 3 and FIG. 4A, and exemplified by FIG. 5F. Thus, for example, FIG. 3 and FIG. 4A illustrates how to program a computer to automatically add, or suggest for addition, the next node in the path shown for the directed acyclic graph (200) shown in FIG. 2. The transition probability dictionary may be built using the method of FIG. 4B, as exemplified by FIG. 5A through FIG. 5E.

In an embodiment, the next node selected may be multiple ones of the candidate nodes. Thus, for example, the node (218), the node (222), and the node (226) could be added to the path defined by the node (202), the node (206), and the node (208). In this case, the node (218), the node (222), and the node (226) depend from the node (208), connected by the corresponding edges of the directed acyclic graph (200) defined for the nodes.

While FIG. 1 and FIG. 2 show a configuration of components, other configurations may be used without departing from the scope of the one or more embodiments. For example, various components may be combined to create a single component. As another example, the functionality performed by a single component may be performed by two or more components.

Attention is now turned to FIG. 3 and FIG. 4B, which show flowcharts of methods, in accordance with one or more embodiments. In particular, FIG. 3 and FIG. 4B show examples of methods for computer assisted programming using an automated next node recommender for complex directed acyclic graphs, in accordance with one or more embodiments. Still more particularly, FIG. 3 shows a method for computer assisted programming, while FIG. 4B shows a method for building a transition probability dictionary used in the method of FIG. 3. The methods of FIG. 3 and FIG. 4B may be executed using the system shown in FIG. 1 and the directed acyclic graph shown in FIG. 2, possibly in conjunction with the computing system and network environment shown in FIG. 6A and FIG. 6B.

FIG. 3 shows a method for computer assisted programming using an automated next node recommender for complex directed acyclic graphs, in accordance with one or more embodiments. The method of FIG. 3 may be implemented using the system shown in FIG. 1 using a directed acyclic graph, such as the directed acyclic graph (200) shown in FIG. 2. The method of FIG. 3 also may be executed using the computing system and network environment shown in FIG. 6A and FIG. 6B.

Step 300 includes setting an initial lookback path length for a current path in a directed acyclic graph. The initial lookback path may be set automatically or set by a policy. The initial lookback path may be set based on a current length of the current path. The initial lookback path may be set to a specific number, such as 3, for a path having 4 or more steps. Longer or shorter lookback paths may be possible, though for complex directed acyclic graphs, the longer the initial lookback path. Longer initial lookback paths may use greater computing resources, and hence use more time when providing a recommendation for a next node. However, in some cases, longer initial lookback paths might increase the probability that a relevant next node will be suggested.

As described above, the directed acyclic graph may be two or more nodes, each including a corresponding set of executable code which, when executed by a processor, performs an action on a computer. The directed acyclic graph also includes one or more edges. Each of the edges includes an operational relationship between at least two of the nodes. Thus, the current path is a subset of the nodes, connected by a sequence of the edges.

Step 302 includes querying, for a current lookback path length, whether a key is present in a transition probability dictionary (TPD). The current lookback path length initially has the initial lookback path length, which may be the maximum training level in an embodiment. The query may be performed by performing a query command on the data structure that holds the transition probability dictionary. An example of a query command is a structured query language (SQL) command, though many other commands are possible.

Step 304 includes determining whether the key is present, as described above for step 302. If the key is not present (a "no" determination at step 304), then the method skips to step 312. If the key is present (a "yes" determination at step 304), then the method continues to step 306.

Step 306 includes querying whether a value is present in the transition probability dictionary for the key. Again, the value is a sample path in the transition probability dictionary. Thus querying involves determining whether there is a value associated with the current key.

Step 308 includes determining whether the value or values are present. If no value is associated with a current key (a "no" determination at step 308), then there is no sample path available, and therefore no possible recommendation for a next node with respect to the current key. In this case, the method skips to step 312. If so (a "yes" determination" at step 308), then the method proceeds to step 310. Step 308 contemplates that multiple values may be present for the current key.

Step 310 includes determining whether a value matches. Specifically, a determination is made whether one of the values for the current key matches a sub-path, within the current path, that ends with the current node. If no such match exists (a "no" determination at step (310), then the method proceeds to step 312. However, if a match does exist (a "yes" determination at step (310), then the method proceeds to step (314).

Note that because all values for the given key are consolidated (as described above), only one value for a given key can match the sub-path (of the current path) that ends in the current node. Thus, step 310 is a determination whether a unique value for the current key matches a sub-path within the current path that ends in the current node.

Step 314 includes returning one or more of the candidate next nodes associated with the values(s). Again, the candidate next nodes are associated with the specific value that matched the current key. Again, more than one candidate next node may be associated with the value that matched the sub-path of the current path that ends in the current node. Each candidate next node is associated with a unique probability. The probabilities may be used to distinguish among multiple candidate next nodes, as described below.

Note that the method of FIG. 3 does not continue to look for possible matches in those values that exist for lower keys. Instead, what is returned is the candidate node(s) associated with the first value(s) that match the highest key for which a value match exists.

In an embodiment, the candidate next node that is returned at step 314 is the candidate next node that has the highest probability among all candidate next nodes associated with the matching value. In this case, the candidate next node may be returned to a user display device as a recommended next node. Alternatively, the candidate next node may be added automatically to the current path, thereby automatically generating the next node and moving closer to the final path.

If the multiple probabilities are the same, and are also higher than all other probabilities for other candidate next nodes associated with the matching value, then some other process may select the recommended next node. For example, both candidate next nodes may be returned to the user, and the user may use a user device to select a selected next node. In another embodiment, both such candidate next nodes may be added to the current node. In still another embodiment, a rule or procedure may be used to select from among the equally likely candidate next nodes.

The candidate next node(s) may be returned by transmitting a message to the remote user via the communication interface, such as via email, a pop-up window, a message, or some other communication method. The candidate next node(s) may be returned via a message which may be displayed by a monitor, via an auditory stimulus, a haptic stimulus, or combinations thereof. The candidate next node may be returned by automatic inclusion in the current path, as described above.

When a one or more nodes are returned for presentation to a user, the user may be prompted to select one of the candidate nodes as being the next node. Thus, for example, the user may select, as the next node, the candidate node associated with a value having the highest rank. However, the user possibly might not be required to select the recommended node).

The method of FIG. 3 may be varied by selecting a next node from the candidate next nodes, and then adding the next node to the current path. Regardless of which of the candidate next nodes is selected as the next node, the next node(s) are connectable in a valid operational relationship to a node of the subset of nodes (i.e., the current node). Again, the subset of nodes is the current set of nodes that form the current version of the algorithm under construction, terminating at the current node that is under consideration. Thus, the next node is connectable in a valid operational relationship to the current node in the current path.

Regardless of which node is selected, the selected node is added to the current path (i.e., the subset of nodes) as the next node. The subset of nodes combined with the next node may form a final path in the directed acyclic graph. If so, the final path is a computer implemented algorithm executable by a processor.

However, the method may be re-initiated after adding the selected node to the current path. In other words, the newly added node may become the new current node, and the method of FIG. 3 repeated in order to find a new set of candidate nodes that could be added to the new current node.

Attention is returned to step 312. Step 312 occurs either in the case that no value is present for the current key (a "no" determination at step 308) or no value associated with the current key matches a sub-path, in the current path, that terminates with the current node (a "no" determination at step 310).

Step 312 includes reducing a path length for the current look path by one and updating the current lookback path by dropping a first step in the current lookback path. So long as the current lookback path is not zero, then by reducing the current lookback path by one, when the method repeats steps 302 through 310, the method effectively will search the values for the next lower key. The values for the next lower key will then be compared to the shorter current lookback path. In other words, it is more likely that a next node will be present because the current lookback path is smaller, and furthermore there are likely more values associated with a lower key.

Thus, after step 312, the method proceeds to step 316. Step 316 includes determining if the current lookback path length is zero. If not (a "no" determination at step 316), then the process returns to step 302 and repeats, as described above. If so, (a "yes" determination at step 316), then the method proceeds to step 318. Note that if the current lookback path equal zero, then it is not possible for there to be any more values to search, because the key will be zero. A key of zero will have no values.

Thus, step 318 includes returning a result of "no recommendation." The result may be returned as described above for returning one or more of the candidate next nodes at step 314. Alternatively, in the case of an automated process, the current node may become the final node, or an error code may be returned. For example, an error code may report that the attempt to automatically generate the algorithm failed because no next node was found. Alternatively, some other node (e.g. a node to be added by default) could be added to the algorithm under construction, possibly terminating the process and returning the current path as the final path of the algorithm.

Note that the result of "no recommendation" at step 318 occurs if no value is present at step 308 for any iteration of the method of FIG. 3 over the various current lookback path lengths checked by the method. Because the probability of finding a next node increases with decreasing lookback path length, in many or most cases at least one candidate node is likely to be returned at later step 314.

The method of FIG. 3 may be varied. For example, once the current path becomes the final path, a computer-implementable algorithm has been generated. In this case, the computer-implementable algorithm may be executed by executing the code in each node in the final path, together possibly with any code added by the edges that connect the nodes.

In a variation, prior to executing the computer-implementable algorithm, the method may include first storing the computer-implemental algorithm. In this case, an end user (i.e., some individual or computer other than the entity that constructed the computer-implementable algorithm) may generate a query that is received by the system (e.g., an enterprise system). In this case, executing the computer-implementable algorithm includes executing, in response to receiving the user inquiry, a first node in the final path.

As a result of executing, the first node may output an option. The option may be presented to the end user. A response to the option may be received from the user. A second node in the final path may then be executed. In the case that the algorithm is built for execution on an enterprise system that hosts an online marketplace, the final path may be a customer computer implemented algorithm hosted by the enterprise system.

FIG. 4A is a flowchart of a method of recommending a next node. FIG. 4A is a variation of the method of FIG. 3. Thus, the method of FIG. 4A may be implemented using the system of FIG. 1.

Step 401 includes setting an initial lookback path length for a current path in a directed acyclic graph. Setting the initial lookback path length may be performed manually, or may be automatically set (e.g., automatically set to the path length of the current path).

The directed acyclic graph includes nodes. Each of the nodes includes a corresponding set of executable code which, when executed by a processor, performs an action on a computer. The directed acyclic graph also includes edges. Each of the edges includes an operational relationship between at least two of the nodes. The current path includes, at least, a subset of the nodes connected by a sequence of the edges.

Step 403 includes querying, for a current lookback path length, whether a matching key is present in a transition probability dictionary (TPD). The current lookback path length initially is the initial lookback path length. A matching key is present in the transition probability dictionary if a number for the key matches the current lookback path length.

Step 405 includes querying, responsive to the matching key being present in the TPD for the current lookback path length, whether a matching value is present for the matching key. The matching value is a sample path in the transition probability dictionary that matches the current path. A matching value is present if a value associated with the current key matches a sub path in the current path that terminates in the current node.

Step 407 includes returning, responsive to the matching value being present in the transition probability dictionary for the matching key, a next node in the nodes of the directed acyclic graph. The next node is associated with the matching value as specified in the transition probability dictionary. The next node is connectable in a valid operational relationship to a last node in the current path. The next node may be returned as described with respect to step 314 of FIG. 3.

FIG. 4B shows a method for building a transition probability dictionary used in the method of FIG. 3. The method of FIG. 4B may be executed using the system shown in FIG. 1, possibly in conjunction with the computing system and network environment shown in FIG. 6A and FIG. 6B. An example of generating a transition probability dictionary is shown in FIG. 5A. In an embodiment, the method of FIG. 5A may be referred-to as a training phase (i.e., generating the transition probability dictionary is training the transition probability dictionary for use in the method of FIG. 3).

Step 400 includes receiving a set of paths for a directed acyclic graph. The set of paths may, for example, one or more prior paths generated using the directed acyclic graph. For example, the set of some or all prior customer computer implemented algorithms created by merchant users using the directed acyclic graph (whether or not the computer implemented algorithms were created using the method of FIG. 3) form set of paths received at step. 400.

Again, the directed acyclic graph may be two or more nodes. Each of nodes includes a corresponding set of executable code which, when executed by a processor, performs an action on a computer. The directed acyclic graph also includes one or more edges. Each of the edges includes an operational relationship between at least two of the nodes. Thus, the current path may be a subset of the nodes connected by a sequence of the edges.

Step 402 includes determining a maximum training level and setting a current training level to the maximum training level. Again, the training level is the length of a sub-path, within an overall path within a directed acyclic graph, that will be examined for transitions. Determining the maximum training level may be set by automatic policy (i.e., the maximum training level is "3"). However, the maximum training level also may be set by a user (e.g., a computer programmer who is generating the transition probability dictionary).

As indicated, the initial training level is set to be the maximum training level. However, as the method of FIG. 4B iterates, as explained further below, the current training level decreases over time.

Step 404 includes constructing a transition probability set for the current training level. The transition probability set is a set of probabilities associated with candidate next nodes. The candidate next nodes are associated with a given value, which in turn is associated with a given key.

The transition probability set is created for the current training level by constructing an upper level dictionary, a lower level dictionary, and determining the probabilities of transitions between nodes (the probabilities of transitions is the transition probability set). A more detailed explanation of this process, including specific examples of the upper and lower level dictionaries, is explained in FIG. 5A through FIG. 5E.

Briefly, constructing the transition probability set at step 404 may proceed as follows. A set of paths in the directed acyclic graph is received. An upper level dictionary is generated from the paths. The upper level dictionary is a subset of the total available paths that have path lengths equal to the current training level plus one, as well as the frequency of each particular path in the set of paths. The lower level dictionary is then generated from the upper level dictionary. The lower level dictionary is the subsets of paths for the upper level dictionary, but where the last step is removed. The lower level dictionary also includes a frequency of the particular subsets of paths in the set of paths.

Constructing the transition probability set at step 404 then includes determining a number of times a transition occurs from each of the subsets of paths in the lower level dictionary to the set of paths in the upper level dictionary. Then, a determination is made, for each of the set of paths in the upper level dictionary, a corresponding proportion of the number of times a corresponding transition occurs relative to a total number of transitions between the lower level dictionary and the upper level dictionary. This process is shown by way of example three times, once each in FIG. 5B, FIG. 5D, and FIG. 5E.

Finally, constructing the transition probability set at step 404 then includes adding, to the transition probability dictionary, i) the set of paths in the upper level dictionary and ii) the corresponding proportion for each of the paths in the upper level dictionary. The transition probability set is presented in decreasing order of probability; thus, the highest probability candidate next node is presented first in the transition probability set for the given value. Again, the transition probability dictionary at various stages in the construction process is shown by way of example three times in FIG. 5B, FIG. 5D, and FIG. 5E.

Returning to FIG. 4B, Step 406 includes adding the transition probability set to a transition probability dictionary. Adding the transition probability set to the transition probability dictionary may be performed by storing the transition probability set in a single data structure, or in multiple linked data structures. Over time, during the iterations of the method of FIG. 4B, the transition probability dictionary will grow with additional transition probability sets until the process terminates. The process of generating the transition probability set and the growth of the transition probability dictionary over iterations of the method of FIG. 4B is shown in FIG. 5A through FIG. 5E.

Step 408 includes reducing the current training level by one to form a new training level. Thus, on the first iteration of FIG. 4B, the current training level is one less than the maximum training level. The current training level may be referred-to as a "new" training level at each iteration of step 408.

Step 410 includes determining whether the current training level (i.e., the new training level) is greater than zero. If yes, (a "yes" determination at step 410), then the process returns to step 404 and repeats. Thus, for example, the method would then include constructing a new transition probability set for the new training level, and then adding the new transition probability set to the transition probability dictionary.

However, if the current training level is equal to zero (a "no" determination at step 410), then the process proceeds to step 412. Step 412 includes storing of the transition probability dictionary. The stored transition probability dictionary may be referred-to as the final transition probability dictionary.

While the various steps in flowcharts of FIG. 3 and FIG. 4B are presented and described sequentially, at least some of the steps may be executed in different orders, may be combined or omitted, and at least some of the steps may be executed in parallel. Furthermore, the steps may be performed actively or passively.

Given the understanding, above, regarding the directed acyclic graph, the nodes of the directed acyclic graph, and the process of recommending a next node in a path of nodes within the directed acyclic graph, attention is now turned to treatment of a particular type of node in the directed acyclic graph. Specifically, attention is turned to treating a type of node known as a "delay node."

A delay node is a node that commands that a period of time expire before executing some other node in the path. In other words, a delay node is a step that forces a process (i.e., a "journey") to wait before proceeding.

A delay may be expressed in various time measurements, but may be expressed in seconds. For example, a delay of 86,400 represents a delay of 1 day, a delay of 172800 represents a delay of 2 days, a delay of 604,800 represents a delay of 1 week, a delay of 1,209,600 represents a delay of 2 weeks, etc.

In an embodiment, delay nodes may be characterized by their length. Thus, for example, one delay node may be 86,400 seconds, a second delay node may be 1,209,600 seconds, etc. However, in another embodiment, a delay node may have a variable time. In this case, the user or some automated process may specify the duration of the delay in the node.

Within a path of the directed acyclic graph, a delay node may be expressed as, for example, 'signup, delay: 86400'. A path within the directed acyclic graph may be, for example, 'signup, delay: 86400, send_email'. In this example, the two nodes (signup, delay and send_email) represent a path which, when executed, delays the current execution of the path for 1 day and then sends an email.

Because of the variety of different durations of delays, the data for determining the length of a delay node to recommend becomes sparse. In other words, it may be difficult to recommend the most likely or optimal time delay for to precede a next process, because of the many different time options that could be selected for or set for the delay node.

Thus, the one or more embodiments may treat delay nodes with additional pre-processing procedures. In particular, the one or more embodiments may use the following pre-processing procedure to modify the original data set used to build the transition probability dictionary. (In the example of FIG. 5, the data set would be the set of paths at step 503, but in this example, the journey data set would also include delay nodes of various delay lengths).

First, the one or more embodiments determine a set of the most commonly used delay values in the data set of users. The size of the set may be pre-determined. For example, the size of the set may be "12," in which case the 12 most commonly used delay values may be determined. However, the size of the set may be varied in other embodiments.

Second, before the training phase (i.e., prior to the execution of FIG. 4B, as exemplified by FIG. 5A through FIG. 5E), determine for each delay node in the set of paths (e.g. "journey data set") whether a given node has a delay value that is equal to a delay value of one of the delay nodes in the set of delay nodes designated at the first step, above. Delay nodes in the set of all available delay nodes are retained if such delay nodes have delay values equal to a delay value of at least one of the delay nodes in the designated set. Other delay nodes in the set of all delay nodes (i.e., those delay nodes in the set of all delay nodes that do not match a value in the designated set) are modified to match a closest value of a delay node value in the designated set.

In other words, delay nodes with pre-determined values are retained unchanged in the original data set. Delay nodes outside the pre-determined values are changed to match the pre-determined values of the more commonly used delay nodes. Thereafter, the training phase commences (i.e., construction of the transition probability dictionary (TPD)), but now using the modified original data set. In this manner, the number of delay nodes may be reduced before constructing the TPD.

In a specific example, the pre-determined set of delay nodes have delay values of 1 day, 2 days, 3 days, 4 days, 5 days, 1 week, 2 weeks, 4 weeks, 30 days, 60 days, 100 days, and 120 days. For the sake of clarity in this example, the original data set (e.g., the journey data set) has two delay nodes with two delay values. The first delay node has a delay value of 1 day. The second delay node has a delay value of 15 days.

The delay node with a delay value of 1 day is retained. The value of the delay node with a delay value of 15 days is changed to a value of 14 days (the delay value in the pre-determined set of delay values that most closely matches the delay value of 15 days). The modified original data set is then used to build the transition probability dictionary according to the method of FIG. 4B or the method of FIG. 5A through FIG. 5E.

FIG. 5A, FIG. 5B, FIG. 5C, FIG. 5D, FIG. 5E, FIG. 5F, FIG. 5G, FIG. 5H, FIG. 5I, and FIG. 5J show an example of computer assisted programming using an automated next node recommender for complex directed acyclic graphs, in accordance with one or more embodiments. The example of FIG. 5A through FIG. 5J represent specific examples of the methods shown in FIG. 3 and FIG. 4B, and may be implemented using the system of FIG. 1 in the context of the directed acyclic graph of FIG. 2. The following example is for explanatory purposes only and not intended to limit the scope of the one or more embodiments.

FIG. 5A is a method for generating the transition probability dictionary. Thus, FIG. 5A represents the overall process of the training phase and is a variation of the method of FIG. 4B. FIG. 5B through FIG. 5E together show the method of FIG. 5A in the context of a specific example.

Step 500 includes determining a maximum training level and setting the current training level to the maximum training level. The maximum training level is set by a computer programmer, or by an automated process.

Step 502 includes constructing an upper level dictionary and a lower level dictionary for the current level. The upper and lower level dictionaries are constructed using an available set of paths. In the example of FIG. 5, the paths are customer computer implemented algorithms created by customers using the directed acyclic graph shown in FIG. 2. Thus, possibly thousands of different algorithms, each representing a different path in the directed acyclic graph, may be available. Each of the different paths is one of the computer implemented algorithms in the directed acyclic graph.

The process of building the upper and lower level dictionaries is described in detail in FIG. 4B for step 404. The specific example of building the upper and lower level dictionaries at each of three different training levels is shown in FIG. 5B through FIG. 5E.

Step 504 includes calculating the probabilities of transitions between upper and lower level dictionaries. The process of building the upper and lower level dictionaries is described in detail in FIG. 4B for step 404. The specific example of the probabilities of transitions at each of three different training levels is shown in FIG. 5B through FIG. 5E.

Step 506 includes appending the calculated probabilities to a transition probability dictionary. Thus, the data structure for the transition probability dictionary may be established the first time that step 506 is performed. At each subsequent iteration, new transition probabilities are appended to the transition probability dictionary. This process is shown by way of example in FIG. 5B through FIG. 5E.

Step 508 includes decreasing the current training level by one. Thus, at the first iteration of step 508, the current training level is the maximum training level less one.

At step 510, a determination is made whether the current training level is greater than zero. If so (a "yes" determination at step 510), then the process returns to step 502 and repeats, thereby expanding the transition probability dictionary when step 506 is repeated. If not (a "no" determination at step 510, meaning that the current training level equals zero), then at step 512 the transition probability dictionary is stored. The transition probability dictionary is considered completed.

Attention is now turned to FIG. 5B through FIG. 5E, which shows the generation of a transition probability dictionary by way of a specific example. In particular, the maximum training level is set to 3 at step 501.

At step 503, the computer implemented algorithm data set (i.e., the set of the paths in the directed acyclic graph that will be used to build the exemplary transition probability dictionary) is received. Each phrase separated by a comma represents a node in the directed acyclic graph. Thus, each phrase represents a block of code that is executable to perform a function in an enterprise system that hosts an online marketplace. The code performs some function in the enterprise system for an end user.

In the example of FIG. 5A, path 1 is "signup, send email, and archive contact." Thus, path 1 includes a first node, "signup." The first node is a code block which is executable to present a form to an end user to sign up to use the online marketplace. The second node in path 1 is "send email." The second node is a code block which is executable to send an email to the customer confirming that the customer has signed up with the online marketplace. The third node in path 1 is "archive contact." The third node is a code block which is executable to archive (i.e. store) the contact in a database which the enterprise system later may reference.

The code blocks in path 1 are executable in order. Thus, first the signup code block is executed, then the send email code block, then the archive contact code block. Each code block is a node in the directed acyclic graph, and the nodes are connected via edges which indicate how the code blocks are connected together with any additional programming desirable for handling inputs and outputs between nodes and/or any other connecting functions. Thus, path 1 is one example of a path (i.e., a computer implemented algorithm) along nodes in the directed acyclic graph shown in FIG. 2.

Path 2, path 3, and path 4, as shown in FIG. 5B at step 503, are similarly different paths (i.e., computer implemented algorithms) along nodes in the directed acyclic graph shown in FIG. 2. Each path forms one computer implemental algorithm that is executable at runtime by the enterprise system. Each computer implemented algorithm performs some task in the online marketplace.

At step 505, the first upper level dictionary is created. The term "first" refers to the first time the method of FIG. 5A is iterated. The upper level dictionary includes any of the four paths shown at step 503 which have a path length equal to or greater than the maximum training level plus one. In the example shown, path 2, path 3, and path 4 have four steps, which is the current training level plus one. Thus, path 2, path 3, and path 4 are included in the first upper level dictionary.

The first upper level dictionary also includes the number of times that any given sub-path in the upper level dictionary occurs. Because each path occurs exactly once in step 503, the number 1 is assigned to each path. Note that if a second instance of path 1 had occurred within the computer implemented algorithm data set, then the number 2 instead would have been associated with path 1. Stated differently, the paths that fit the criteria are placed as keys and their values are the number of times the keys are encountered.

At step 507, the last steps on each sub-path in the upper level dictionary is erased. The resulting sub-paths form the entries lower level dictionary. Duplicate entries are consolidated and counted. The number of times that a sub-path occurs within the resulting lower level dictionary is associated with each sub-path.

The result of step 507 is shown at step 509. The first lower level dictionary includes two sub-paths, one of which occurs once and the second of which occurs twice.

Step 511 includes calculating the number of times transitions that happen from each of the sub-paths from the first lower level dictionary to the sub-paths in the first upper level dictionary. Then, the resulting number is divided by the total number of transitions. The resulting values, and their associated sub-paths, are added to the transition probability dictionary corresponding to the training level. The resulting values, and their corresponding probabilities, are added in ranked order from highest to lowest.

Step 513 shows the resulting transition probability dictionary at iteration 1 of the method of FIG. 5A. There are two transitions possible between the sub-paths of first lower level dictionary and the sub-paths of the first lower level dictionary. Each transition is represented on each line of the transition probability dictionary shown at step 513. Refer to FIG. 5C to understand how the transition probability dictionary shown at step 513 includes two transitions (i.e., values) for the key of "3", as well as the candidate next nodes and their associated probabilities.

Step 515 includes dropping the training level to 2, corresponding to step 508 of FIG. 5A. Because the number 2 is greater than zero (e.g., step 510 of FIG. 5A), the process iterates again and returns the procedure at step 502 of FIG. 5A. This process is continued by way of example in FIG. 5D.

However, attention is first turned to FIG. 5C. FIG. 5C labels, in detail, each part of the transition probability dictionary shown at step 513 of FIG. 5B.

The key (513A) is the number "3". The number "3" means that the transition probability dictionary will include values in transitions between the upper and lower level dictionaries of path length 3. The key (513A) of 3 also means that the values associated with the key (513A) will be compared to the current lookback path when the current lookback path is of length 3.

The transition probability dictionary at step 513 of FIG. 5B includes two values: value 1 (513B) and value 2 (513E). Both values represent sample paths. No other values will exist in the transition sample paths dictionary for the key (513A).

The value 1 (513B) has only one candidate next node (513C). Thus, the probability (513D) of the candidate next node (513C) is equal to "1" (i.e., a 100% probability). Accordingly, if the current lookback path matches the value (513B), then the returned recommended next node will be the candidate next node (513C).

However, the value 2 (513E) has two associated candidate next nodes; candidate next node 1 (513F) and candidate next node 2 (513H). Each candidate next node has one associated probability. The candidate next node 1 (513F) has probability (513G). The value of the probability (513G) is 0.5, meaning that there is a 50% chance that the selected next node is the candidate next node 1 (513F). Likewise, the candidate next node 2 (513H) has probability (5131). The value of the probability (5131) is also 0.5, meaning that there is a 50% chance that the selected next node is the candidate next node 2 (513H).

Because the probabilities for the two candidate next nodes associated with the value 2 (513E) are equal, both may be presented to the user. The user may select one of the two. Alternatively, other methods may be used to deal with the equal probabilities, as described with respect to step 314 of FIG. 3.

More specifically, if the sub path of the current path matches the set of nodes defined as "'CAMPAIGN_OPENED,SEND_EMAIL,ADD_REMOVE_TAG'", then the next node will be "'UPDATE MERGE'". In other words, if the computer executable algorithm under construction has nodes that open a campaign, then send an email, and then add or remove a tag, then the next node in that algorithm will be to execute a code block (node) to "update and merge."

Attention is now turned to FIG. 5D. FIG. 5D is a continuation of the method started in FIG. 5B.

At step 517 the second upper level dictionary is created. The term "second" is used because step 517 occurs at the second iteration of the method of FIG. 5A. Now, the current training level is two. Thus, possible sub-paths of length 3 are considered for the available paths in the path set that have a length of 3 or greater. That is, because the training level is 2, any path in the set of paths of length 3 or greater is considered (i.e., 4 paths at this point). Possible sub-paths of length 3 or greater within each path are considered. Duplicate sub-paths of length 3 may occur, which are consolidated and counted.

Note that, because path 1 in step 503 of FIG. 5B has a length of 3 or greater, path 1 is now considered when establishing the second upper level dictionary in step 517, in addition to sub-paths of length 2 that are within path 2, plus the sub-paths of length 2 that are within path 3, and the sub-paths of length 2 that are within path 4. The resulting sub-paths that of length 3 within the path data set shown at step 503 is as shown in Step 517. Each number represents the number of occurrences of a sub-path of the indicated type (i.e. sub-paths of length 3) within the set of paths being considered (with the set of paths being considered being path 1, path 2, path 3, and path 4).

At step 519, again the step of erasing the last steps on each sub-path of the second upper level dictionary is performed. The result, at step 521, is to generate a second lower level dictionary having the possible number of times that each new sub-path appears. Specifically, the second lower level dictionary at step 521 includes sub-paths of length 2 within the sub-paths shown for the second upper level dictionary at step 517, along with the number of times that each sub-path of length 2 occurs in the second upper level dictionary.

At step 523, again, a calculation is made of number of times transitions occur from each of the sub-paths in the second lower level dictionary to the sub-paths in the second upper level dictionary. The resulting number is divided by the total number of transitions. The results of dividing are associated with each transition between the second lower level dictionary and the second upper level dictionary. The final result is then added as key-value pairs to the transition probability dictionary corresponding to the training level.

Step 525 shows the resulting transition probability dictionary. Note that the transition probability dictionary at step 525 includes the transitions and probabilities (i.e., key-value pairs) generated at step 511 of FIG. 5B plus those transitions and probabilities (i.e., key-value pairs) generated at step 523 of FIG. 5D. Thus, the transition probability dictionary at step 525 includes values for both key 3 and values for key 2. Again, each line shown in the transition probability dictionary at step 525 represents one value and its associated candidate next node(s) (and their probability or probabilities).

Step 527 includes dropping the training level again by one. Because the training level had been 2, the current training level is now set to 1. The example is continued in FIG. 5E.

The procedure in FIG. 5E is a repeat of the procedure shown in FIG. 5A and FIG. 5D. Thus, a third upper level dictionary is created, as shown at step 529. Because each of the paths at step 503 have path lengths of two (one more than the current training level), four of the paths shown at step 503 are now considered. However, now, sub-paths of length 2 within the path 1, path 2, path 3, and path 4 are considered (i.e., path lengths of one greater than the training level, or 1+1=2). There are now a significantly larger number of sub-paths, and two different instances of sub-paths of length 2 that have multiple occurrences within path 1, path 2, path 3, and path 4. The resulting sub-paths of length 2, and their number of occurrences, are shown at step 529.

At step 531, again the step of erasing the last steps on each sub-path of the third upper level dictionary is performed. The result is to generate a third lower level dictionary having the possible number of times that each new sub-path appears. Specifically, the third lower level dictionary at step 533 includes sub-paths of length 1 within the sub-paths shown for the third upper level dictionary at step 529, along with the number of times that each sub-path of length 1 occurs in the third upper level dictionary.

At step 535, again, a calculation is made of number of times transitions occur from each of the sub-paths in the third lower level dictionary to the sub-paths in the third upper level dictionary. The resulting number is divided by the total number of transitions. The results of dividing are associated with each transition between the third lower level dictionary and the third upper level dictionary. The final result is then added as key-value pairs to the transition probability dictionary corresponding to the training level.

Step 537 shows the resulting transition probability dictionary. Note that the transition probability dictionary at step 537 includes the transitions and probabilities (i.e., key-value pairs) generated at step 511 of FIG. 5B, plus those transitions and probabilities (i.e., key-value pairs) generated at step 523 of FIG. 5D, plus those transitions and probabilities (i.e., key-value pairs) generated at step 535 of FIG. 5E. Thus, the transition probability dictionary at step 537 includes values for key 3, values for key 2, and also for values for key 1.

Again, each line shown in the transition probability dictionary at step 537 represents one value and its associated candidate next node(s) (and their probability or probabilities). For the four values associated with key 1, the second value ("'send email'") and its associated candidate next nodes are shown in a smaller font so that the entire set of that value, its candidate next nodes, and the associated probabilities are all shown on one line.

Step 539 includes dropping the training level again by one. Because the training level had been 1, the current training level is now set to 0. However, as indicated by step 510 in FIG. 5A, when the current training level is set to zero, the iterative process of steps 500, 502, 504, 506, and 508 of FIG. 5A terminate.

Accordingly, at step 541, the transition probability dictionary (shown at step 537) is stored. The transition probability dictionary shown at step 537 is considered the final transition probability dictionary that will be used at runtime (such as with respect to the method shown in FIG. 3). The training phases process is now considered complete, and the method of FIG. 5A through FIG. 5E terminates.

Attention is now turned to FIG. 5F. The method of FIG. 5F is a variation of the method shown in FIG. 3. Thus, like FIG. 3, FIG. 5F is a method performed during the inference phase of the one or more embodiments.

In the example of FIG. 5A through FIG. 5J, the method of FIG. 5F is performed when a user is building a computer-executable algorithm. In particular, the user has created an algorithm using nodes in the directed acyclic graph of FIG. 2, and the current node is "add/remove group" in a lookback path that includes "send email." The user is unsure which available node in the directed acyclic graph should come next. The user selects a widget displayed in an online dashboard which prompts the server to execute the method of FIG. 5F. The result of executing the method of FIG. 5F will be to determine one or more likely next nodes as being the next code block to add to the algorithm being built, and then to present those one or more likely next nodes to the user.

Step 550 may be characterized as a first step. Step 550 includes, for the given lookback path length, checking if the current node is a "key" in the transition probability dictionary. If the current node is a "key", move to Step 2 (step 552). Otherwise, move to Step 3 (step 554).

Step 552 may be characterized as a second step. Step 552 includes finding the corresponding next node(s) in the transitions of the transition probability dictionary that corresponds to the key(s). Also find the probability value(s) associated with the key(s) and move to Step 4 (step 556). Otherwise, move to Step 3 (step 554).

Step 554 may be characterized as a third step. Step 554 includes updating the lookback path length by reducing the current lookback path length by 1 and updating the current lookback path by dropping its first node, and using this reduced sub-path as the new lookback path. If the updated lookback path length is equal to 0, stop the algorithm and conclude that there is no recommendation. Otherwise, repeat Step 1 (step 550).

Step 556 may be characterized as a fourth step. Step 554 includes taking the next node with the highest transition probability value as the recommended next node. Stop the search algorithm, and return the recommended next to the user interface.

In an embodiment, the candidate next nodes for matching value may be stored in a separate data structure (e.g. a file named "predict_proba_dict"). The first candidate next node, having the highest associated probability, may be presented to the user as the candidate next node.

FIG. 5G through FIG. 5J show example graphical user interfaces of computer implemented algorithms constructed by merchant users that desired to generate computer-executable algorithms for an online marketplace hosted by an enterprise system. Each computer implemented algorithm was constructed using the method of FIG. 5F. Each computer implemented algorithm is a computer-executable program generated by a merchant user with little or no programming skill.

Each block of each computer implemented algorithm represents a node on a directed acyclic graph, such as the directed acyclic graph (200) shown in FIG. 2. Each node contains computer executable code for implementing the function described in the text in the corresponding block. The nodes are connected by edges that describe data flow between the nodes, and that may provide additional code for implementing the proper execution of the computer implemented algorithms in the order of the nodes presented.

Figures 5I, 5J:
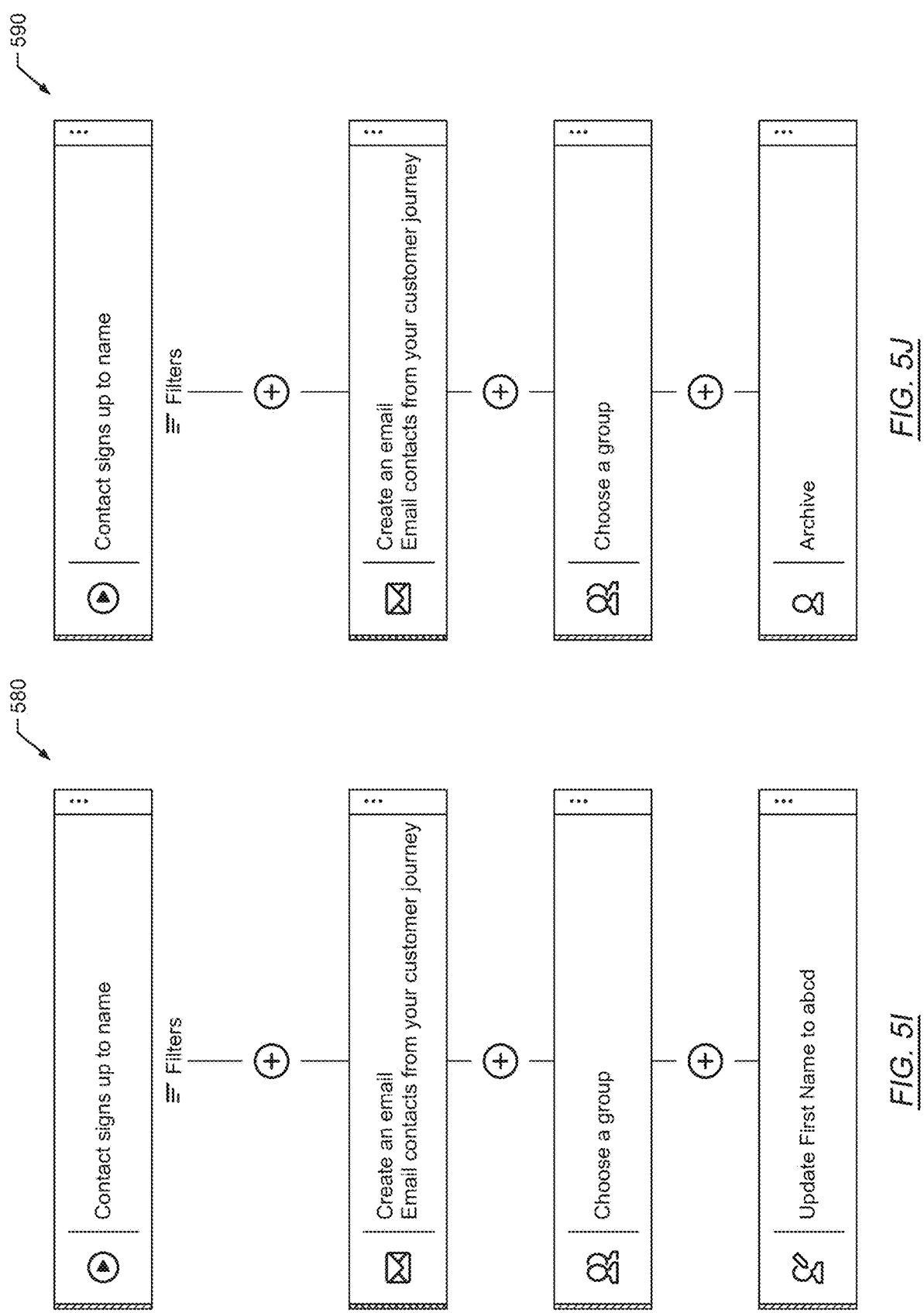

FIG. 5G shows a first computer implemented algorithm (560). The first computer implemented algorithm (560) describes a customer user (e.g. a customer of the merchant user who generated the first computer implemented algorithm (560)) signing up as a contact having a name. At the first block, code is executed to present a user interface to the customer user to enter contact information. Next, the first computer implemented algorithm (560) will automatically execute code in the second block to create an email that will contact the named customer. Finally, the first computer implemented algorithm (560) will automatically execute code in the third block to archive the contact generated by execution of the first block. FIG. 5H through FIG. 5J include other steps, as shown in those figures.

Each of the examples of computer implemented algorithms shown in FIG. 5G through FIG. 5J (i.e., computer implemented algorithm (560), computer implemented algorithm (570), computer implemented algorithm (580), and computer implemented algorithm (590)) are demonstrated real application examples of path 1, path 2, path 3, and path 4 in the journey data set shown at step 503 of FIG. 5B. Thus, the transition probability dictionary shown at step 537 of FIG. 5E may be built using the paths shown in FIG. 5G through FIG. 5J.

In each computer implemented algorithm, a block is a node on the directed acyclic graph of FIG. 2. As can be seen, many different computer implemented algorithms (i.e., computer-implementable algorithms) may be created by combining different nodes to form different paths within the directed acyclic graph.

In use, a merchant may build the merchant's own computer implemented algorithm using various different combinations of the nodes shown in FIG. 5G through FIG. 5J. Specifically, as the merchant is combining code blocks while building the merchant's own computer implemented algorithm, the methods of FIG. 3, FIG. 4, and FIG. 5F may be used to recommend a next node, based on the transition probability dictionary created using the paths shown in FIG. 5G through FIG. 5J. Thus, merchant users with little or no programming skill are able to build their own algorithms that control how to respond to different customers that interact with an online marketplace executed by an enterprise system.

Figure 6A:
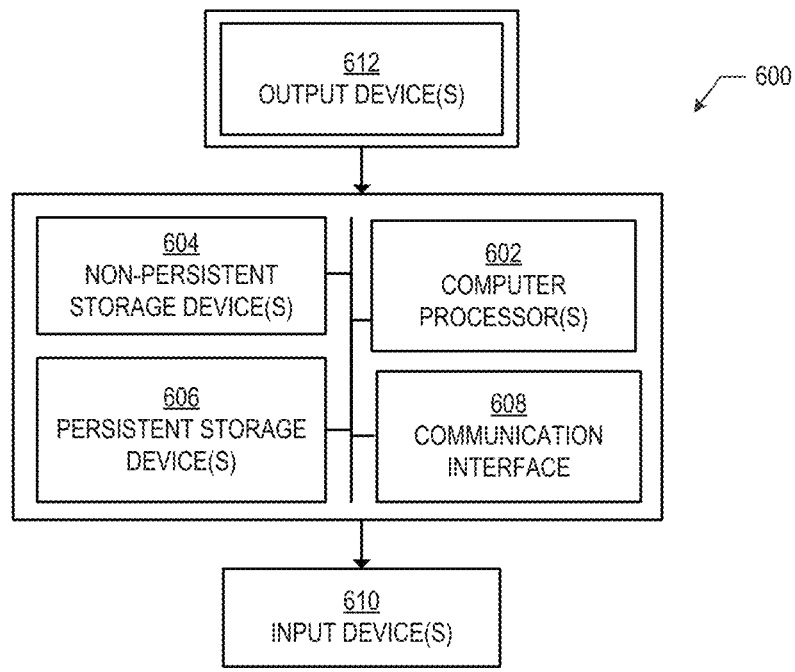
FIG. 6A and FIG. 6B show a computing system and network environment, in accordance with one or more embodiments.

The one or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 6A, the computing system (600) may include one or more computer processor(s) (602), non-persistent storage device(s) (604), persistent storage device(s) (606), a communication interface (608) (e.g., Bluetooth interface, infrared interface, network interface, optical interface, etc.), and numerous other elements and functionalities that implement the features and elements of the disclosure. The computer processor(s) (602) may be an integrated circuit for processing instructions. The computer processor(s) may be one or more cores or micro-cores of a processor. The computer processor(s) (602) includes one or more processors. The one or more processors may include a central processing unit (CPU), a graphics processing unit (GPU), a tensor processing units (TPU), combinations thereof, etc.

The input devices (610) may include a touchscreen, keyboard, mouse, microphone, touchpad, electronic pen, or any other type of input device. The input devices (610) may receive inputs from a user that are responsive to data and messages presented by the output devices (612). The inputs may include text input, audio input, video input, etc., which may be processed and transmitted by the computing system (600) in accordance with the disclosure. The communication interface (608) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the output devices (612) may include a display device, a printer, external storage, or any other output device. One or more of the output devices may be the same or different from the input device(s). The input and output device(s) may be locally or remotely connected to the computer processor(s) (602). Many different types of computing systems exist, and the aforementioned input and output device(s) may take other forms. The output devices (612) may display data and messages that are transmitted and received by the computing system (600). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 6B:
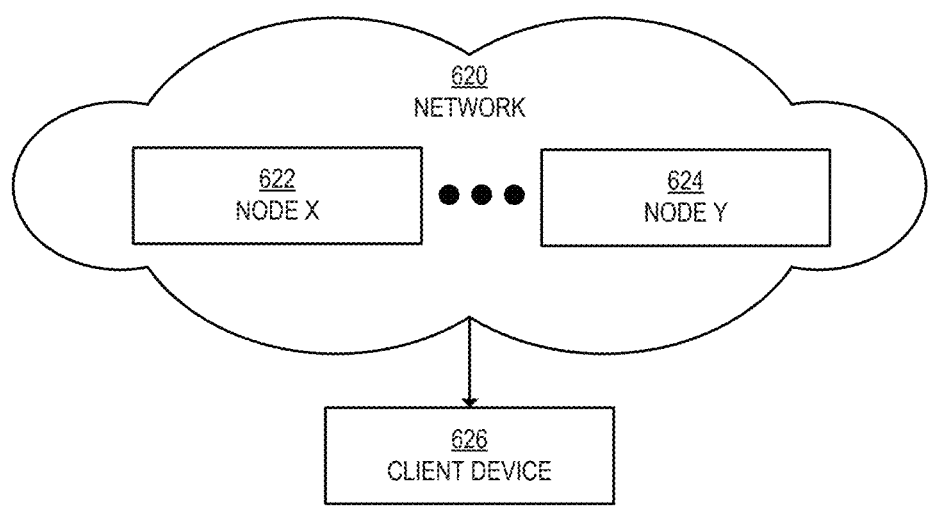

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (600) may be located at a remote location and connected to the other elements over a network.

The nodes (e.g., node X (622), node Y (624)) in the network (620) may be configured to provide services for a client device (626), including receiving requests and transmitting responses to the client device (626). For example, the nodes may be part of a cloud computing system. The client device (626) may be a computing system, such as the computing system shown in FIG. 6A. Further, the client device (626) may include and/or perform all or a portion of one or more embodiments.

The computing system of FIG. 6A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
   setting an initial lookback path length for a current execution path in a directed acyclic graph model stored in a physical storage device, wherein the directed acyclic graph model comprises:
     a plurality of nodes stored in the physical storage device, each of the plurality of nodes storing a corresponding set of computer-executable code which, when executed by a processor, performs a least one computer-executed action; and
     a plurality of edges, stored in the physical storage device, each of the plurality of edges storing an operational relationship between at least two of the plurality of nodes and linking the at least two of the plurality of nodes in the physical storage device,
   wherein the operational relationship comprises one or more sequences of execution by the processor of two or more of the plurality of nodes; and
   wherein the current execution path comprises a subset of the plurality of nodes connected by a sequence of the plurality of edges;
   querying, for a current lookback path length, whether a matching key is present in a transition probability dictionary (TPD) stored in the physical storage device, wherein the current lookback path length initially comprises the initial lookback path length;
   querying, responsive to the matching key being present in the TPD for the current lookback path length, whether a matching value is present for the matching key, wherein the matching value comprises a sample path in the TPD that matches the current execution path; and
   returning, responsive to the matching value being present in the TPD for the matching key, a next node in the plurality of nodes of the directed acyclic graph model, wherein:
     the next node is associated with the matching value as specified in the TPD, and
     the next node is executable by the processor in a valid operational relationship to a last node in the current execution path.

2. The method of claim 1, wherein the matching value comprises a plurality of values, wherein the next node comprises a plurality of next nodes associated with the plurality of values, and wherein the method further comprises:
   ranking, prior to returning the plurality of next nodes, the plurality of nodes according to a ranking of the plurality of values in the TPD.

3. The method of claim 2, further comprising:
   returning a highest ranked node in the plurality of next nodes as the next node.

4. The method of claim 2, further comprising:
   returning the plurality of next nodes in a ranked order;
   receiving a selection of a selected next node; and
   returning the selected next node as the next node.

5. The method of claim 1, further comprising:
   reducing, responsive to the matching key not being present in the TPD for the current lookback path length, the current lookback path length by one by dropping a first step in the current execution path,
   wherein reducing forms a new current lookback path length.

6. The method of claim 1, wherein:
   the matching value comprises a plurality of next nodes associated with a corresponding plurality of probabilities, and
   the next node is a returned next node in the plurality of next nodes, and
   the returned next node has a highest probability among the corresponding plurality of probabilities.

7. The method of claim 1, wherein:
   the matching value comprises a plurality of next nodes associated with a corresponding plurality of probabilities,
   the plurality of next nodes include a subset of next nodes for which a corresponding subset of the corresponding plurality of probabilities are equal, and
   the method further comprises:
     presenting, to a user via display device, the subset of next nodes;
     receiving, from the user via a user input device, a selected next node from the subset of next nodes; and
   wherein the next node is the selected next node.

8. The method of claim 1, further comprising:
adding the next node to the subset of the plurality of nodes, wherein:
the subset of the plurality of nodes combined with the next node form a final execution path in the directed acyclic graph model, and
the final execution path is a computer implemented algorithm executable by the processor.

9. The method of claim 8, further comprising:
executing the computer implemented algorithm by executing each node in the final execution path.

10. The method of claim 8, further comprising, prior to executing the computer implemented algorithm:
storing the computer implemented algorithm; and
receiving a user inquiry from a user,
wherein executing the computer implemented algorithm comprises executing, in response to receiving the user inquiry, a first node in the final execution path.

11. The method of claim 10, further comprising:
outputting, by the first node, an option;
presenting the option to the user;
receiving a response to the option from the user; and
executing, based on the option, a second node in the final execution path.

12. The method of claim 9 wherein the final execution path comprises a customer computer implemented algorithm hosted by an enterprise system.

\* \* \* \* \*